(12) United States Patent
Watanabe

(10) Patent No.: US 10,911,659 B2
(45) Date of Patent: Feb. 2, 2021

(54) ACCESSORY DEVICE, CAMERA, AND STORAGE MEDIUM

(71) Applicant: CANON KABUSHIKI KAISHA, Tokyo (JP)

(72) Inventor: Yutaka Watanabe, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/694,174

(22) Filed: Nov. 25, 2019

(65) Prior Publication Data

US 2020/0099850 A1     Mar. 26, 2020

Related U.S. Application Data

(63) Continuation of application No. PCT/JP2018/020770, filed on May 30, 2018.

(30) Foreign Application Priority Data

May 31, 2017   (JP) ................................ 2017-108269
May 30, 2018   (JP) ................................ 2018-102945

(51) Int. Cl.
   *H04N 5/232*   (2006.01)
   *G03B 17/14*   (2006.01)
   (Continued)

(52) U.S. Cl.
   CPC ......... *H04N 5/23209* (2013.01); *G03B 17/14* (2013.01); *G03B 17/565* (2013.01); *H04N 5/2252* (2013.01); *H04N 5/2254* (2013.01)

(58) Field of Classification Search
   CPC ............. H04N 5/23209; H04N 5/2252; H04N 5/2254; H04N 5/232411; H04N 5/23241;
   (Continued)

(56) References Cited

U.S. PATENT DOCUMENTS 5,257,058 A  * 10/1993  Mabuchi ................ G03B 17/14
                                                       348/240.3
6,707,992 B2 *  3/2004  Uenaka ................ G02B 27/646
                                                         396/529

(Continued)

FOREIGN PATENT DOCUMENTS

JP       11-344764 A    12/1999
JP     2007-148592 A     6/2007
(Continued)

*Primary Examiner* — Pritham D Prabhakher
(74) *Attorney, Agent, or Firm* — Canon U.S.A., Inc. IP Division

(57) ABSTRACT

An accessory device 100 being able to switch an operating state between an active state and a sleep state in which power consumption is smaller than in the active state performs communication with a camera 200 via a notification channel CS used for signal transfer between the camera 200 and the accessory device 100 and a data communication channel DATA used for data communication between the camera and the accessory device. The accessory device receives active instruction data that is transmitted from the camera in response to output of a predetermined signal from the accessory device in the sleep state via the notification channel, and switches the operating state of the accessory device 100 from the sleep state to the active state upon receiving the active instruction data.

9 Claims, 12 Drawing Sheets

(51) Int. Cl.
*G03B 17/56* (2006.01)
*H04N 5/225* (2006.01)

(58) Field of Classification Search
CPC ........... H04N 1/00896; H04N 1/00888; H04N 1/00891; G03B 17/14; G03B 17/565; G03B 17/56
USPC .......................................................... 348/335
See application file for complete search history.

(56) References Cited

U.S. PATENT DOCUMENTS

| | | | | |
|---|---|---|---|---|
| 7,522,828 | B2* | 4/2009 | Doi | G03B 17/56 396/71 |
| 8,414,205 | B2* | 4/2013 | Okada | G03B 17/14 396/530 |
| 8,755,684 | B2* | 6/2014 | Sugiyama | G03B 17/565 396/301 |
| 8,814,449 | B2* | 8/2014 | Hasuda | G03B 17/566 396/530 |
| 9,042,715 | B2* | 5/2015 | Kawanami | G03B 5/00 396/90 |
| 10,079,968 | B2* | 9/2018 | Galor | H04N 5/232933 |
| 10,511,770 | B2* | 12/2019 | Watanabe | G03B 17/14 |
| 2011/0229114 | A1* | 9/2011 | Okada | G03B 17/14 396/71 |
| 2011/0229115 | A1* | 9/2011 | Okada | G03B 17/14 396/71 |
| 2012/0033955 | A1 | 2/2012 | Okada | |
| 2013/0028590 | A1* | 1/2013 | Hasuda | G03B 17/566 396/530 |
| 2013/0077952 | A1* | 3/2013 | Sugiyama | G03B 17/56 396/530 |
| 2013/0077954 | A1* | 3/2013 | Oikawa | G03B 17/14 396/530 |
| 2015/0116592 | A1 | 4/2015 | Suzuki | |
| 2016/0105613 | A1* | 4/2016 | Takanashi | G02B 7/14 348/333.02 |
| 2016/0119538 | A1* | 4/2016 | Kim | H04N 5/23206 348/360 |
| 2017/0052797 | A1 | 2/2017 | Shu | |
| 2018/0224720 | A1 | 8/2018 | Pan | |

FOREIGN PATENT DOCUMENTS

| | | |
|---|---|---|
| JP | 2009-186545 A | 8/2009 |
| JP | 2012-37692 A | 2/2012 |
| JP | 2013-178326 A | 9/2013 |
| JP | 2014-71289 A | 4/2014 |
| JP | 2016-61800 A | 4/2016 |
| JP | 2016-167719 A | 9/2016 |
| JP | 2017-41833 A | 2/2017 |
| WO | 2013/168742 A1 | 11/2013 |
| WO | 2017/068912 A1 | 4/2017 |

* cited by examiner

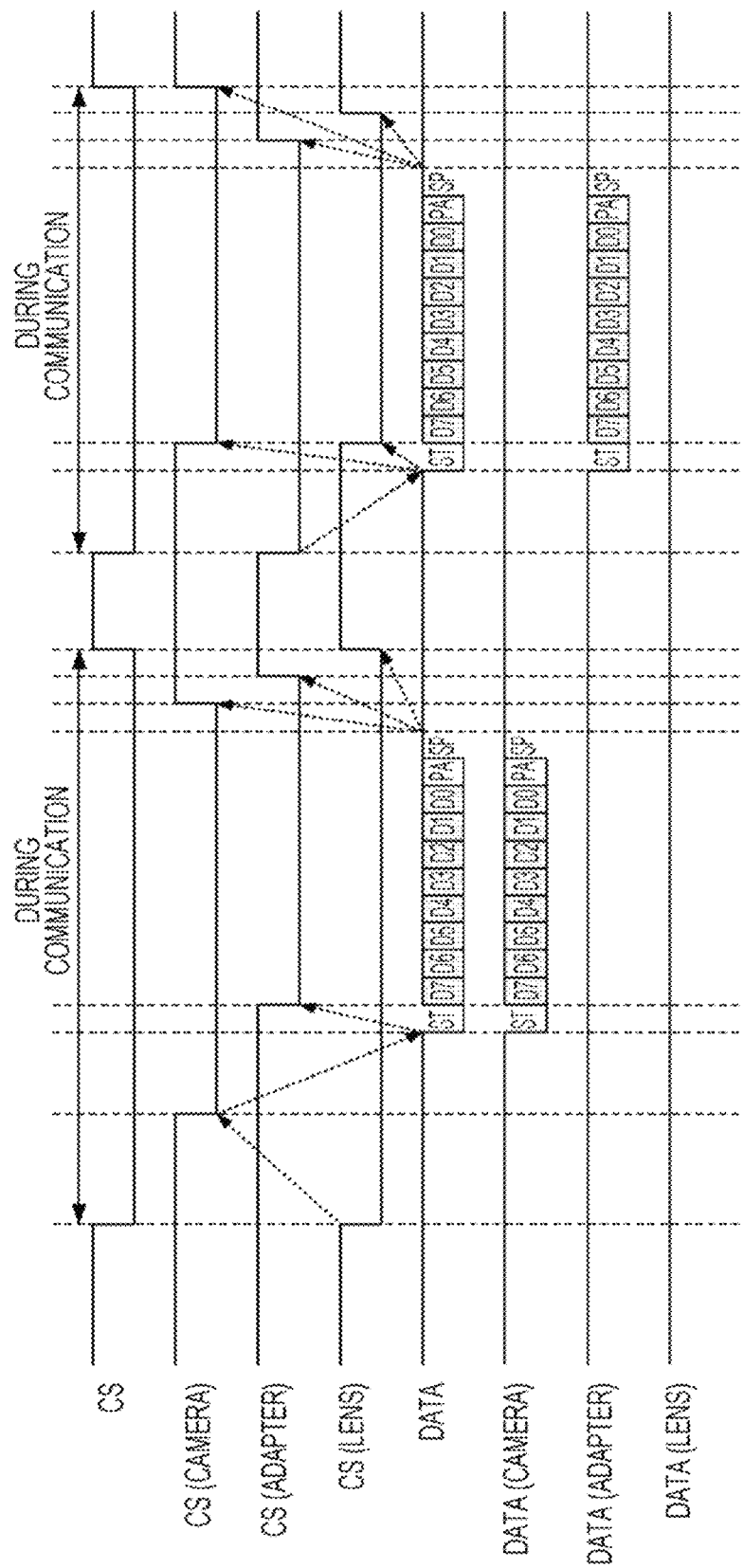

ACCESSORY DEVICE, CAMERA, AND STORAGE MEDIUM

CROSS-REFERENCE TO RELATED APPLICATIONS

This application is a Continuation of International Patent Application No. PCT/JP2018/020770, filed May 30, 2018, which claims the benefit of Japanese Patent Application No. 2017-108269, filed May 31, 2017 and No. 2018-102945, filed May 30, 2018, both of which are hereby incorporated by reference herein in their entirety.

TECHNICAL FIELD

The present invention relates to a camera and an accessory device, such as an intermediate adapter or an interchangeable lens, which can communicate with each other.

BACKGROUND ART

As an example of interchangeable-lens camera systems, there is known a system in which a camera performs an image pickup process and lens control, and in which an interchangeable lens serving as a first accessory device performs lens driving in accordance with a control command from a camera main unit. In such a camera system, transfer of the control command from the camera main unit to the interchangeable lens and transfer of lens information from the interchangeable lens to the camera main unit are performed via a communication channel for mutual exchange of information.

There is also known a camera system in which an intermediate adapter serving as a second accessory device, e.g., a converter for changing the focal length of the interchangeable lens, can be connected between the camera main unit and the interchangeable lens in order to extend the photographing function. In such a camera system, communication between the camera main unit and the intermediate adapter is often needed in addition to communication between the camera main unit and the interchangeable lens.

Patent Literature (PTL) 1 discloses a communication control method in accordance with the I2C (Inter-Integrated Circuit) communication protocol. In I2C communication, a plurality of communication slaves is connected to a communication master, and one-to-many communication is performed between the communication master and the plurality of communication slaves.

CITATION LIST

Patent Literature

Japanese Patent Laid-Open No. 2007-148592

A communication system performing the one-to-many communication between the communication master and the plurality of communication slaves is generally constituted such that each of the communication slaves can notify, to the communication master, a request such as for requesting cancelation of a low power-consumption mode. However, giving the communication slave with the function of canceling the low power-consumption mode in an unlimited fashion is not desired because it is difficult for the communication master to appropriately control an operating state of the communication slave.

An object of the present invention is to realize an accessory device and a camera which can appropriately control an operating state between the camera and the accessory device.

SUMMARY OF INVENTION

The present invention provides an accessory device removably mounted to a camera and being able to switch an operating state between an active state and a sleep state in which power consumption is smaller than in the active state, the accessory device including an accessory control unit controlling communication that is performed between the camera and the accessory device via channels, the channels including a notification channel used for signal transfer between the camera and the accessory device and a data communication channel used for data communication between the camera and the accessory device, wherein the accessory control unit outputs a predetermined signal via the notification channel in the sleep state, receives, via the data communication channel, active instruction data that is transmitted from the camera in response to output of the predetermined signal, and that instructs switching of the operating state of the accessory device from the sleep state to the active state, and switches the operating state of the accessory device from the sleep state to the active state upon receiving the active instruction data from the camera.

The present invention further provides a camera to which an accessory device is mountable, the accessory device being able to switch an operating state between an active state and a sleep state in which power consumption is smaller than in the active state, the camera including a camera control unit controlling communication that is performed between the camera and the accessory device via channels, the channels including a notification channel used for signal transfer between the camera and the accessory device and a data communication channel used for data communication between the camera and the accessory device, wherein the camera control unit transmits active instruction data to the accessory device via the data communication channel upon receiving a predetermined signal output to the notification channel from the accessory device in the sleep state, the active instruction data instructing switching of the operating state of the accessory device from the sleep state to the active state.

Further features of the present invention will become apparent from the following description of exemplary embodiments with reference to the attached drawings.

BRIEF DESCRIPTION OF DRAWINGS

FIG. 9 is a schematic view illustrating communication waves in the broadcast communication started from the accessory device.

DESCRIPTION OF EMBODIMENTS

Figure 1:
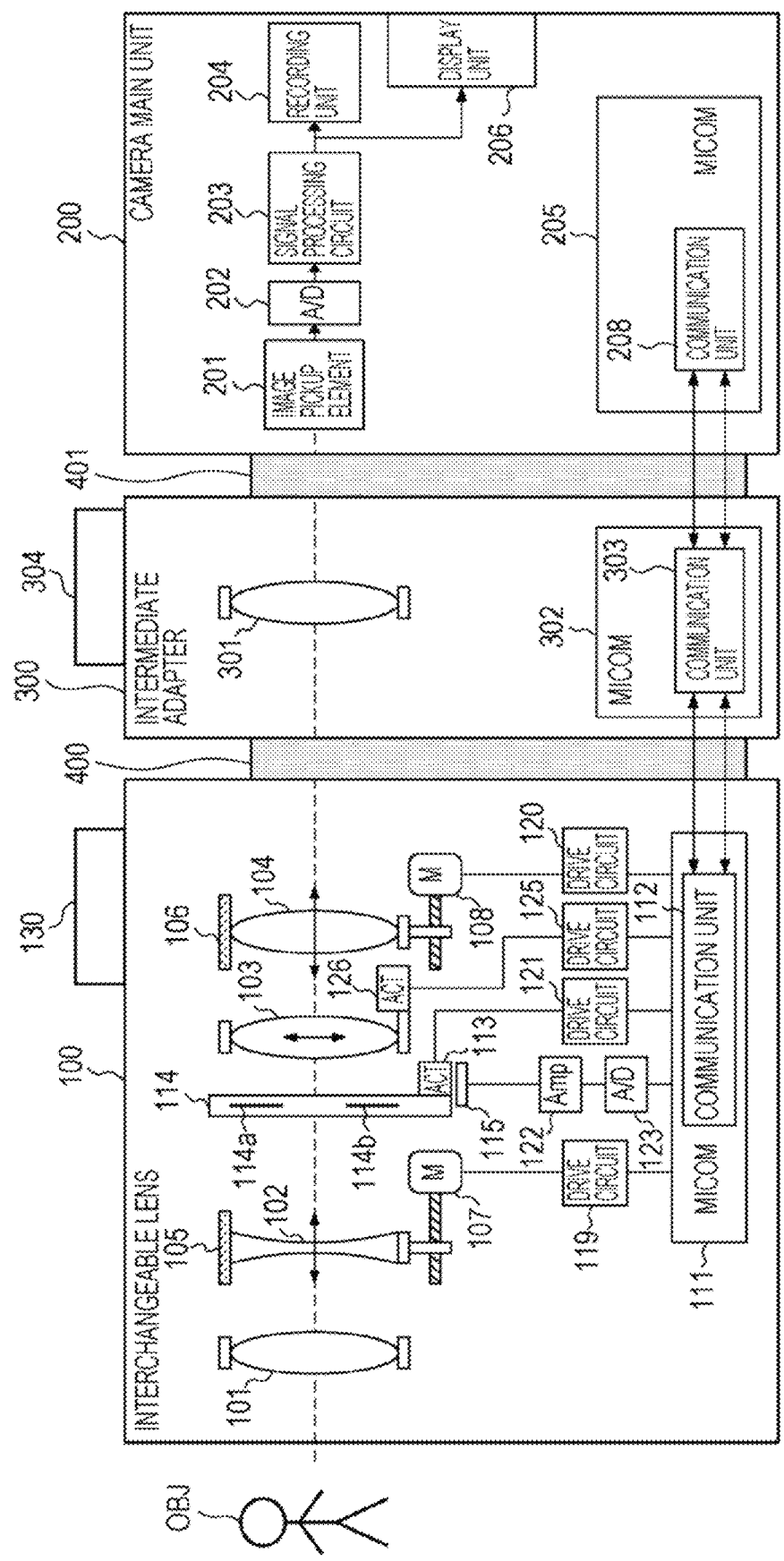
FIG. 1 is a block diagram illustrating a configuration of a camera system, which includes an image pickup device and an accessory device, according to the present invention.

A communication control method for an accessory device, including an interchangeable lens and an intermediate adapter, and a camera according to the present invention will be described in detail below with reference to the accompanying drawings. Between the accessory device and the camera, communication is performed in accordance with a plurality of communication modes. The term "communication mode" implies a broadcast communication mode and a P2P communication mode. In the following description, the broadcast communication is called a first communication mode and the P2P communication mode is called a second communication mode in some cases.

An operating state of the accessory device can be switched between an active state (normal power-consumption state) and a sleep state (low power-consumption state). A lens microcomputer 111 and an adapter microcomputer 302 can be each switched between the active state in which the microcomputer operates in response to a user operation without delay while steadily performing communication with a camera microcomputer 205 and the sleep state in which power consumption is lower than in the active state and communication is not performed. The term "user operation" implies an operation of an operating member 130 or an operating member 304 by a user.

Although the following embodiment is described in connection with an example in which one intermediate adapter 300 is mounted between the camera main unit 200 and the interchangeable lens 100, a plurality of intermediate adapters may be mounted between the camera main unit 200 and the interchangeable lens 100.

According to the present invention, in the broadcast communication, data communication is performed from the camera main unit 200 operating as a communication master to individual accessory devices each operating as a communication slave at once. When the camera main unit 200 performs the P2P communication that is one-to-one communication with a particular accessory device, information indicating a communication partner with the camera main unit 200 in the P2P communication is notified to each accessory device in the broadcast communication.

Because the communication partner with the camera main unit 200 is already notified to each accessory device at the timing of the start of the P2P communication, the camera main unit 200 is not required to transmit, to each accessory device, the information for specifying the communication partner in the P2P communication. Thus, a communication speed in the P2P communication can be increased by, after selecting the communication partner with the camera main unit 200 in the broadcast communication, making switching to the P2P communication that is the one-to-one communication method between the camera main unit 200 and the selected communication partner.

Explanation of Configuration of Camera System

FIG. 1 illustrates a configuration of an image pickup system (hereinafter called a camera system) including the camera main unit 200, i.e., a camera according to the present invention, the intermediate adapter 300, and the interchangeable lens 100, the latter two being the accessory devices mountable to the camera main unit 200.

The camera main unit 200, the interchangeable lens 100, and the intermediate adapter 300 transfer control commands and internal information through individual communication units equipped therein. Each of the communication units is adaptable for the broadcast communication and the P2P communication and performs communication in accordance with the communication mode that is determined by the camera main unit 200.

First, detailed configurations of the interchangeable lens 100, the intermediate adapter 300, and the camera main unit 200 are described. The intermediate adapter 300 and the camera main unit 200 are mechanically and electrically connected through a mount 401 that is a coupling mechanism. The intermediate adapter 300 is supplied with electric power from the camera main unit 200 through a not-illustrated power supply terminal, which is provided in the mount 401, to operate the adapter microcomputer (hereinafter called the adapter MICOM) 302.

The interchangeable lens 100 and the intermediate adapter 300 are mechanically and electrically connected through a mount 400 that is a coupling mechanism. The interchangeable lens 100 is supplied with electric power from the camera main unit 200 through a not-illustrated power supply terminal provided in the mount 400 and the not-illustrated power supply terminal provided in the mount 401. By using the electric power received from the camera main unit 200, the interchangeable lens 100 operates later-described various actuators and the lens microcomputer (hereinafter called the lens MICOM) 111. Moreover, the interchangeable lens 100, the intermediate adapter 300, and the camera main unit 200 perform mutual communication through communication terminals (illustrated in FIG. 2) provided in the mounts 400 and 401.

Next, the configuration of the interchangeable lens 100 is described. The interchangeable lens 100 includes an image pickup optical system. The image pickup optical system includes a field lens 101, a zoom lens 102 for zooming, a diaphragm unit 114 for adjusting a light quantity, an image stabilizing lens 103, and a focus lens 104 for focus adjustment, which are successively disposed in the mentioned order from the side close to an object OBJ.

The zoom lens 102 and the focus lens 104 are held by lens holding frames 105 and 106, respectively. The lens holding frames 105 and 106 are movably guided by not-illustrated guide shafts in the direction of an optical axis denoted by a dotted line in the drawing, and are driven in the direction of the optical axis by stepping motors 107 and 108, respectively. The stepping motors 107 and 108 move respectively the zoom lens 102 and the focus lens 104 in synchronism with drive pulses.

The image stabilizing lens 103 is movable in a direction perpendicular to the optical axis of the image pickup optical system to reduce an image blur attributable to a hand shake, etc.

The lens MICOM 111 is an accessory control unit for controlling operations of various components in the interchangeable lens 100. The lens MICOM 111 receives a control command, which is transmitted from the camera main unit 200, through a lens communication unit 112, i.e., an accessory communication unit, and accepts a request for transmitting lens data. Moreover, the lens MICOM 111 performs lens control corresponding to the control command and transmits lens data, which corresponds to the transmission request, to the camera main unit 200 through the lens communication unit 112.

In addition, the lens MICOM 111 outputs drive signals to a zoom drive circuit 119 and a focus drive circuit 120 in response to those ones among control commands, which are related to zooming and focusing, thereby driving the stepping motors 107 and 108. As a result, a zoom process of controlling a zoom operation by the zoom lens 102 and an auto-focus process of controlling a focus adjustment operation by the focus lens 104 are performed.

The diaphragm unit 114 includes diaphragm blades 114a and 114b. States of the diaphragm blades 114a and 114b are detected by a Hall element 115, and a detected signal is input to the lens MICOM 111 through an amplifier circuit 122 and an A/D converter circuit 123. The lens MICOM 111 outputs a drive signal to a diaphragm drive circuit 121 in accordance with an input signal from the A/D converter circuit 123, thereby driving a diaphragm actuator 113. As a result, a light quantity adjustment operation by the diaphragm unit 114 is controlled.

Moreover, the lens MICOM 111 drives an image stabilizing actuator 126 through an image stabilizing drive circuit 125 depending on a shake detected by a not-illustrated shake sensor, such as a vibration gyro, which is disposed in the interchangeable lens 100. As a result, an image stabilizing process of controlling a shift operation of the image stabilizing lens 103 is performed.

The operating member 130 is disposed on the interchangeable lens 100. The operating member 130 is a member capable of being operated by the user, for example, a ring-like member rotatable in a circumferential direction of the interchangeable lens 100. The operating member 130 can be given with various functions. For example, the focus lens 104 may be driven when the user operates the operating member 130. This enables the user to perform manual focus control. Without being limited to such an example, the other member (e.g., the zoom lens 102) than the focus lens 104 may be driven when the user operates the operating member 130.

The configuration of the intermediate adapter 300 is now described. In this embodiment, the intermediate adapter 300 is an extender for extending the focal length of the interchangeable lens 100. The intermediate adapter 300 is not limited to the extender and may be given with various functions. For example, a filter for changing transmittance of light having passed through the interchangeable lens 100 may be incorporated in the intermediate adapter 300. The intermediate adapter 300 may include a plurality of filters having different optical transmittances and may be able to select appropriate one of the filters depending on photographing situations, etc.

The intermediate adapter 300 in this embodiment includes a zoom lens 301 for extending the focal length of the interchangeable lens 100, and the adapter MICOM 302, i.e., an accessory control unit, for controlling operations of various components in the intermediate adapter 300. The adapter MICOM 302 receives a control command, which is transmitted from the camera main unit 200, through an adapter communication unit 303, i.e., an accessory communication unit, and performs adapter control corresponding to the control command. Moreover, the adapter MICOM 302 transmits adapter data, which corresponds to a transmission request from the camera main unit 200, to the camera main unit 200 through the adapter communication unit 303.

The operating member 304 is disposed on the intermediate adapter 300. The operating member 304 is a member capable of being operated by the user, for example, a ring-like member rotatable in a circumferential direction of the intermediate adapter 300. The operating member 304 can be given with various functions. For example, one of the above-mentioned filters may be selected when the user operates the operating member 304.

Next, the configuration of the camera main unit 200 is described. The camera main unit 200 includes an image pickup element 201 such as a CCD sensor or a CMOS sensor, an A/D converter circuit 202, a signal processing circuit 203, a recording unit 204, the camera microcomputer (hereinafter called the camera MICOM) 205, and a display unit 206.

The image pickup element 201 photo-electrically converts an object image that has been formed by the image pickup optical system in the interchangeable lens 100, and outputs an electrical signal (analog signal). The A/D converter circuit 202 converts the analog signal from the image pickup element 201 to a digital signal. The signal processing circuit 203 performs various types of image processing on the digital signal from the A/D converter circuit 202 and produces a video signal.

Furthermore, the signal processing circuit 203 produces, from the video signal, focus information indicating a contrast state of the object image, i.e., a focus state of the image pickup optical system, and luminance information indicating an exposure state. The signal processing circuit 203 outputs the video signal to the display unit 206, and the display unit 206 displays the video signal as a live view image that is used to check a composition, a focus state, etc.

The camera MICOM 205 serving as a camera control unit controls the camera main unit 200 in response to inputs from camera operating members, such as an image-pickup instruction switch and various setting switches (not illustrated). Furthermore, the camera MICOM 205 transmits a control command, which is related to the zoom operation of the zoom lens 102, to the lens MICOM 111 through a camera communication unit 208 in response to an operation of a not-illustrated zoom switch. In addition, the camera MICOM 205 transmits control commands for the light quantity adjustment operation of the diaphragm unit 114 depending on the luminance information and the focus adjustment operation of the focus lens 104 depending on the focus information to the lens MICOM 111 through the camera communication unit 208.

The camera MICOM 205 transmits data to the intermediate adapter 300 and the interchangeable lens 100 at once in the broadcast communication and performs one-to-one data communication with one of the intermediate adapter 300 and the interchangeable lens 100 in the P2P communication.

Explanation of Configuration of Communication Circuits

Figure 2:
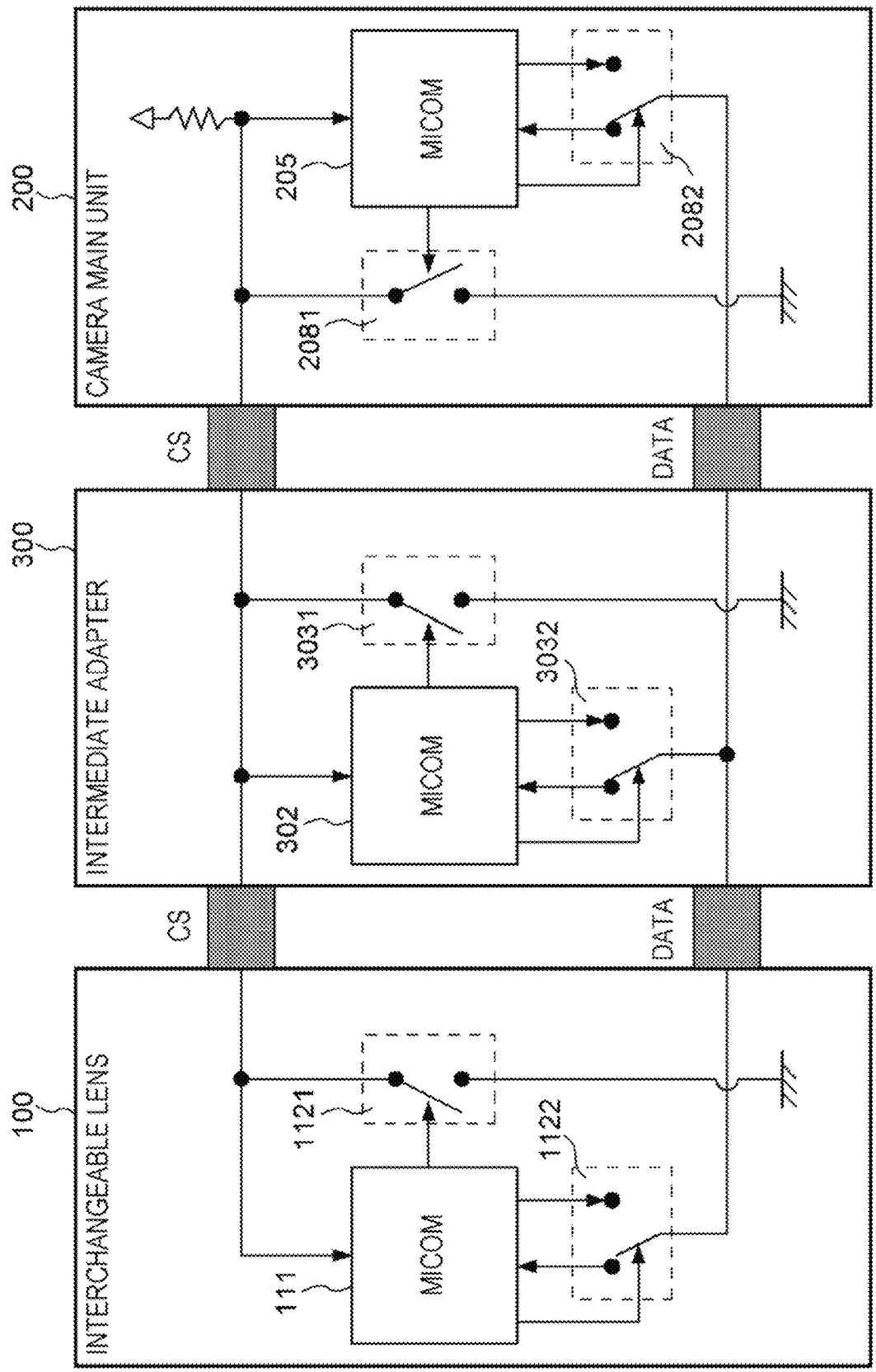
FIG. 2 is a schematic view illustrating communication circuits in the camera system according to the present invention.

Communication circuits constituted in the camera system including the camera main unit 200, the intermediate adapter 300, and the interchangeable lens 100 will be described below with reference to FIG. 2. The camera system in this embodiment includes a notification channel CS used for transfer of signals among the camera main unit 200, the intermediate adapter 300, and the interchangeable lens 100, and a data communication channel DATA used for data communication among them.

As described with reference to FIG. 1, the camera main unit 200 and the intermediate adapter 300 are connected through the mount 401. The mount 401 includes at least two communication terminals. The intermediate adapter 300 and the interchangeable lens 100 are connected through the mount 400. The mount 400 includes at least two communication terminals. The above-mentioned notification channel CS and data communication channel DATA are formed by the communication terminals provided in the mounts.

The notification channel CS is connected to the camera MICOM 205, the adapter MICOM 302, and the lens MICOM 111. Each of the camera MICOM 205, the adapter MICOM 302, and the lens MICOM 111 can detect a signal level (voltage level) of the notification channel CS. Furthermore, the notification channel CS is pull-up connected to a not-illustrated power supply disposed in the camera main unit 200. The notification channel CS is connectable to a ground through a ground switch 2081 included in the camera main unit 200, and is further connectable to the ground through a ground switch 3031 included in the intermediate adapter 300. In addition, the notification channel CS is connectable to the ground through a ground switch 1121 included in the interchangeable lens 100.

With the above-described circuit configuration, the signal level of the notification channel CS can be set to Low by bringing any one of the ground switches included in the camera main unit 200, the intermediate adapter 300, and the interchangeable lens 100 into a connected state. The signal level of the notification channel CS can be set to High by bringing all of the ground switches included in the camera main unit 200, the intermediate adapter 300, and the interchangeable lens 100 into a cutoff state.

Each of the camera MICOM 205, the adapter MICOM 302, and the lens MICOM 111 can change the connected state between the notification channel CS and the ground by changing the connected state of the ground switch. In other words, each of the camera MICOM 205, the adapter MICOM 302, and the lens MICOM ill can set the signal level of the notification channel CS to High or Low by changing the connected state of the ground switch.

For example, the camera MICOM 205 can set the signal level of the notification channel CS to Low by bringing the ground switch 2081 included in the camera main unit 200 into the connected state. In the present invention, bringing the ground switch into the connected state is expressed by the wording "outputting Low to the notification channel CS". Furthermore, bringing the ground switch into the cutoff state is expressed by the wording "outputting High to the notification channel CS".

Thus, the signal level of the notification channel CS is set to High when all of the camera MICOM 205, the adapter MICOM 302, and the lens MICOM 111 output High to the notification channel CS. On the other hand, the signal level of the notification channel CS is set to Low when any one MICOM outputs Low to the notification channel CS. The role of the notification channel CS in data communication will be described later.

The data communication channel DATA is a two-way data communication channel capable of changing a data propagation direction. The data communication channel DATA is connected to the camera MICOM 205, the adapter MICOM 302, and the lens MICOM 111.

The data communication channel DATA is connected to the camera MICOM 205 through an input/output changeover switch 2082 included in the camera main unit 200. The camera MICOM 205 includes a data output unit for transmitting data and a data input unit for receiving data. In accordance with an operation of the input/output changeover switch 2082, the camera MICOM 205 can selectively connect the data communication channel DATA to one of the data output unit and the data input unit.

Furthermore, the data communication channel DATA is connected to the adapter MICOM 302 through an input/output changeover switch 3032 included in the intermediate adapter 300. The adapter MICOM 302 includes a data output unit for transmitting data and a data input unit for receiving data. In accordance with an operation of the input/output changeover switch 3032, the adapter MICOM 302 can selectively connect the data communication channel DATA to one of the data output unit and the data input unit.

The data communication channel DATA is connected to the lens MICOM 111 through an input/output changeover switch 1122 included in the interchangeable lens 100. The lens MICOM 111 includes a data output unit for transmitting data and a data input unit for receiving data. In accordance with an operation of the input/output changeover switch 1122, the lens MICOM 111 can selectively connect the data communication channel DATA to one of the data output unit and the data input unit. With the above-described circuit configuration, the data propagation direction in the data communication channel DATA can be appropriately switched.

Explanation of Data Format

A format of data communicated via the data communication channel DATA will be described below with reference to FIG. 3.

Figure 3:
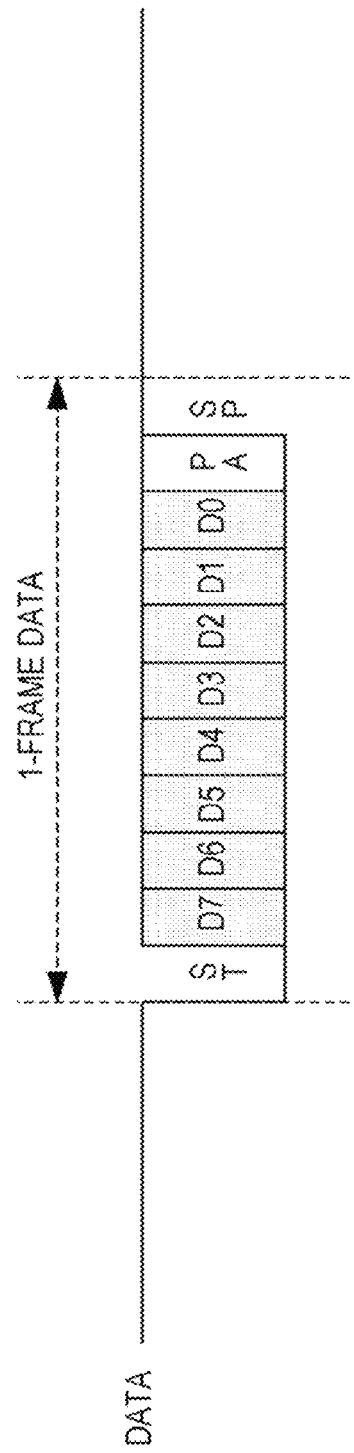
FIG. 3 illustrates a format for data transmitted and received in the present invention.

FIG. 3 illustrates a data format in a start-stop synchronization communication method of previously setting a communication speed on both the data transmitting side and the data receiving side, and performing data communication at a communication bit rate in accordance with the setting. The term "communication bit rate" implies an amount of data capable of being transferred per second, and it is expressed in bps (bit per second). FIG. 3 illustrates a signal waveform of one frame that is a minimum communication unit.

In a state in which the data communication is not performed, a signal level of the data communication channel DATA is maintained at a Hi level. Then, the signal level of the data communication channel DATA is set to Low for a 1-bit period in order to notify the start of the data transmission to the data receiving side. This 1-bit period is called a start bit ST, and a data frame begins with the start bit ST. Data of 1 byte is transmitted for an 8-bit period spanning from the second bit, which succeeds to the start bit ST, to the ninth bit.

A data bit array is in MSB (Most Significant Bit) first format that begins with the most significant data D7, followed by data D6, data D5, etc. in order, and that ends with the least significant data D0. Parity information (PA) of 1 bit is added at the tenth bit, and the signal level of the data communication channel DATA is set to High for a period of a stop bit SP that indicates the end of one frame. A data frame period beginning with the start bit ST is thereby ended. The parity information is not always required to be one bit, and parity information of multiple bits may be added. The parity information not essential, and a format added with no parity information may also be used.

Alternatively, the data bit array may be in LSB (Least Significant Bit) first format that begins with the least significant data D0, followed by data D1, data D2, etc. in order, and ends with the most significant data D7. Although 1-byte data is transmitted for the 8-bit period in this embodiment, the 1-byte data may be transmitted for a bit period other than the 8-bit period.

Explanation of Broadcast Communication

The broadcast communication will be described below with reference to FIG. 4. The broadcast communication is performed under conditions that the camera main unit 200 operates as a communication master and each of the intermediate adapter 300 and the interchangeable lens 100 operates as a communication slave.

Figure 4:
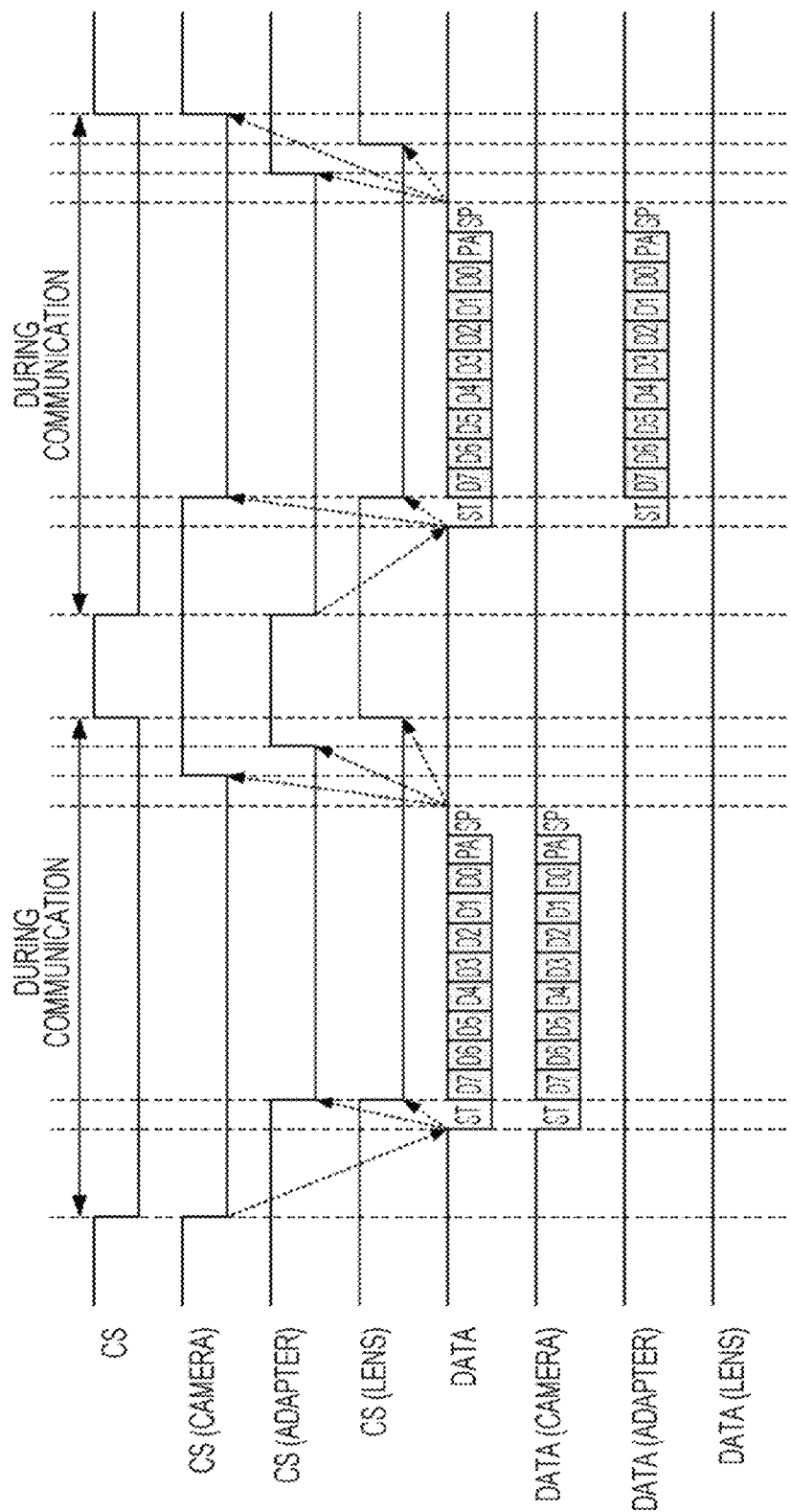
FIG. 4 is a schematic view illustrating communication waves in broadcast communication.

FIG. 4 illustrates signal waves transferred in the broadcast communication. The camera MICOM 205 of the camera main unit 200, i.e., the communication master, notifies the start of the broadcast communication to the lens MICOM 111 and the adapter MICOM 302, i.e., the communication slaves, by outputting Low to the notification channel CS.

Then, the camera MICOM 205 transmits data to the lens MICOM 111 and the adapter MICOM 302 via the data communication channel DATA.

On the other hand, the lens MICOM 111 and the adapter MICOM 302 output Low to the notification channel CS in response to detection of the above-described start bit ST via the data communication channel DATA. Because the camera MICOM 205 already outputs Low at the time when the lens MICOM 111 and the adapter MICOM 302 output Low to the notification channel CS, the signal level of the notification channel CS is continuously kept Low.

The lens MICOM 111 and the adapter MICOM 302 notify a communication wait request by outputting Low to the notification channel CS. The communication wait request is to temporarily stop the communication in the camera system, and the presence of the communication wait request is determined based on the signal level of the notification channel CS.

After transmitting all data, the camera MICOM 205 outputs High to the notification channel CS. After receiving the stop bit SP transmitted via the data communication channel DATA, the lens MICOM 111 and the adapter MICOM 302 execute analysis of the received data and internal processing corresponding to the received data. Then, the lens MICOM 111 and the adapter MICOM 302 output High to the notification channel CS after the preparations for executing the next communication have finished.

When all components constituting the camera system output High to the notification channel CS, the signal level of the notification channel CS becomes High. The camera MICOM 205, the lens MICOM 111, and the adapter MICOM 302 can confirm, based on return of the signal level of the notification channel CS to High, the fact that the components constituting the camera system have come into a state capable of executing the next communication.

In FIG. 4, the data transmitted from the camera MICOM 205 includes a transmission request command to the adapter MICOM 302, and data transmission by the adapter MICOM 302 is performed following the data transmission by the camera MICOM 205.

More specifically, after the signal level of the notification channel CS has become High, the adapter MICOM 302 outputs Low to the notification channel CS. Thus, the adapter MICOM 302 notifies the start of the broadcast communication to the lens MICOM 111 and the camera MICOM 205. Then, the adapter MICOM 302 transmits data to the lens MICOM 111 and the camera MICOM 205 via the data communication channel DATA.

On the other hand, the lens MICOM ill and the camera MICOM 205 output Low to the notification channel CS in response to detection of the above-described start bit ST via the data communication channel DATA. Because the adapter MICOM 302 already outputs Low to the notification channel CS at the time when the lens MICOM 111 and the camera MICOM 205 output Low to the notification channel CS, the signal level of the notification channel CS is continuously kept Low.

After transmitting all data, the adapter MICOM 302 outputs High to the notification channel CS. After receiving the stop bit SP transmitted via the data communication channel DATA, the lens MICOM 111 and the camera MICOM 205 execute analysis of the received data and internal processing corresponding to the received data. Then, the lens MICOM ill and the camera MICOM 205 output High to the notification channel CS after the preparations for executing the next communication have finished.

When all the components constituting the camera system output High to the notification channel CS, the signal level of the notification channel CS becomes High. The camera MICOM 205, the lens MICOM and the adapter MICOM 302 can confirm, based on return of the signal level of the notification channel CS to High, the fact that the components constituting the camera system have come into a state capable of executing the next communication.

As described above, in the broadcast communication, the data transmitting side notifies the start of the broadcast communication to the data receiving side by outputting Low to the notification channel CS and changing the signal level of the notification channel CS from High to Low. The data receiving side notifies cancelation of the communication wait request to the individual components of the camera system by changing the output to the notification channel CS from Low to High.

Although FIG. 4 illustrates an example of the communication waves in the broadcast communication in the present invention, the present invention is not limited to the illustrated example. In another example, the data transmitted or received in one broadcast communication may be data of multiple bytes instead of 1-byte data.

When changing the communication mode from the broadcast communication to the P2P communication, the camera MICOM 205 only transmits data instructing the switching of the communication mode to the lens MICOM 111 and the adapter MICOM 302.

Explanation of P2P Communication

The P2P communication, i.e., the second communication mode in the present invention, will be described below with reference to FIG. 5. In the P2P communication, the camera main unit 200 operates as the communication master and performs one-to-one individual communication with one of the components constituting the camera system, the one being selected as the communication slave.

Figure 5:
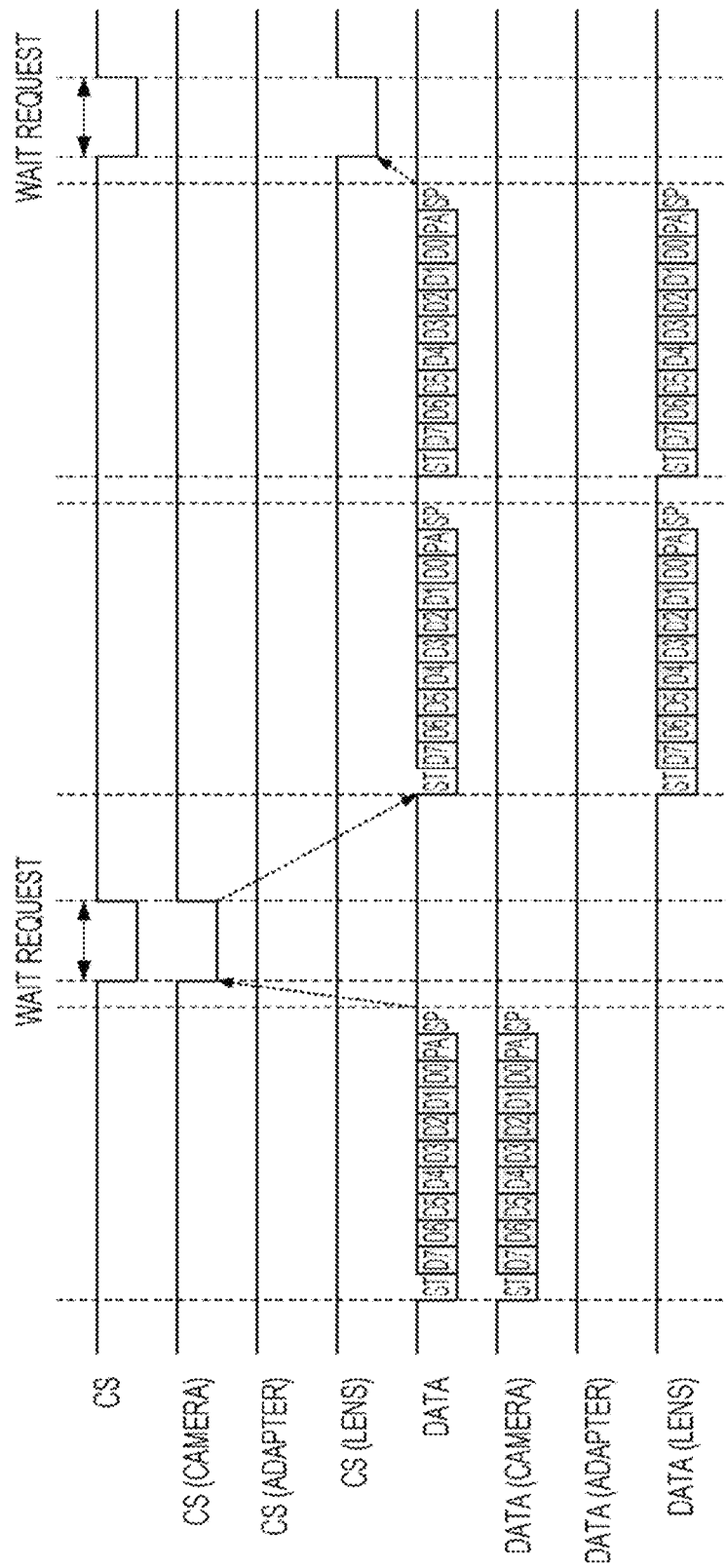
FIG. 5 is a schematic view illustrating communication waves in P2P communication.

FIG. 5 illustrates signal waves transferred in the P2P communication. FIG. 5 illustrates an example in which the interchangeable lens 100 is selected as the communication slave. Information indicating the communication slave in the P2P communication is transmitted in the broadcast communication.

When the communication mode switched from the broadcast communication to the P2P communication, the data transmission from the camera MICOM 205, i.e., the communication master, is first started.

FIG. 5 illustrates an example in which, after transmitting 1-byte data from the camera MICOM 205 to the lens MICOM 111, 2-byte data is transmitted from the lens MICOM 111 to the camera MICOM 205.

After the switching from the broadcast communication to the P2P communication has been completed in the components constituting the camera system, the camera MICOM 205, i.e., the communication master, transmits the data to the lens MICOM 111 via the data communication channel DATA. After the completion of the data transmission, the camera MICOM 205 notifies the communication wait request by outputting Low as the signal level of the notification channel CS. Then, the camera MICOM 205 returns the signal level of the notification channel CS to High after the preparations for receiving data as the data receiving side have finished.

On the other hand, the lens MICOM 111 recognizes the completion of the data transmission from the camera MICOM 205 in accordance with the change of the signal level of the notification channel CS to Low, and executes analysis of the received data and internal processing corresponding to the received data. In the example of FIG. 5, a data transmission request from the lens MICOM 111 to the camera MICOM 205 is included in the data received from the camera MICOM 205, and the lens MICOM 111 produces the data to be transmitted to the camera MICOM 205.

Thereafter, the lens MICOM 111 recognizes cancelation of the communication wait request in accordance with the return of the signal level of the notification channel CS to High, and transmits the 2-byte data to the camera MICOM 205.

After the end of the data transmission, the lens MICOM 111 outputs Low as the signal level of the notification channel CS and notifies the communication wait request. Then, the lens MICOM 111 returns the signal level of the notification channel CS to High after the preparations for receiving data as the data receiving side have finished. The adapter MICOM 302, which is not selected as the communication partner in the P2P communication, neither changes the output to the notification channel CS, nor takes part in the transmission and the reception of data.

In accordance with the timing at which the data transmission from the camera MICOM 205 is performed after the return of the signal level of the notification channel CS to High, the lens MICOM 111 determines whether the P2P communication is continued or the switching to the broadcast communication has been made. When the lens MICOM 111 receives the data from the camera MICOM 205 in a state in which the signal level of the notification channel CS remains High, it determines that the P2P communication is continued. On the other hand, when the lens MICOM 111 receives the data from the camera MICOM 205 after the signal level of the notification channel CS has changed to Low, it determines that the communication mode has been switched from the P2P communication to the broadcast communication.

As described above, in the P2P communication, the data transmitting side notifies, to the data receiving side, the end of the data transmission from the data transmitting side by changing the signal level of the notification channel CS from High to Low. Furthermore, the data transmitting side notifies the communication wait request by holding the signal level of the notification channel CS at Low until the preparations for receiving data as the data receiving side in the next communication have finished.

Explanation of Switching of Communication Mode

Outline of communication executed while switching the broadcast communication and the P2P communication will be described below with reference to FIG. 6. In any of the broadcast communication and the P2P communication, the camera main unit 200 operates as the communication master and executes communication with the intermediate adapter 300 and the interchangeable lens 100. The information indicating the communication partner with the camera main unit in the P2P communication is notified in the broadcast communication.

Figure 6:
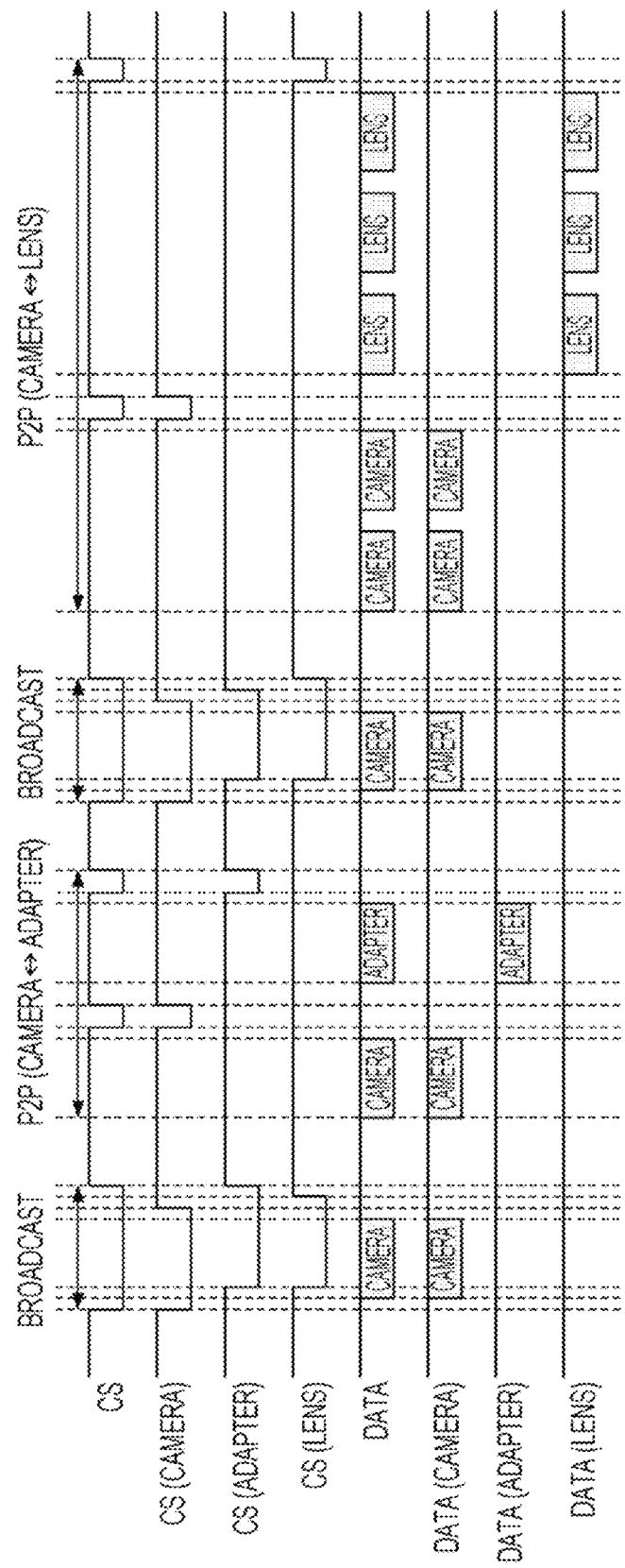
FIG. 6 is a schematic view illustrating communication waves when a communication mode is switched.

FIG. 6 illustrates communication waves in communication that is executed while switching the broadcast communication and the P2P communication. First, the information indicating that the adapter MICOM 302 has been selected as the communication partner in the P2P communication is transmitted and received in the broadcast communication. Then, the P2P communication is performed between the camera MICOM 205 and the adapter MICOM 302. In the following description, the information indicating the communication partner in the P2P communication is called communication-partner designation data.

An example in which the communication-partner designation data is given with the function as a command for switching from the broadcast communication to the P2P communication will be described below. Instead of using the communication-partner designation data, switching to the P2P communication may be performed by transmitting and receiving a signal instructing the switching from the broadcast communication to the P2P communication.

After receiving the communication-partner designation data, the lens MICOM 111, which is not selected as the communication partner in the P2P communication, outputs High to the notification channel CS at the time when the analysis and the internal processing for the data received from the camera MICOM 205 have finished. Then, during a period in which the P2P communication is performed between the camera MICOM 205 and the adapter MICOM 302, the lens MICOM 111 does not change the output to the notification channel CS and maintains the setting corresponding to the broadcast communication.

In more detail, upon the completion of the switching to the P2P communication, the adapter MICOM 302 notifies the completion of the switching to the P2P communication to the camera MICOM 205 by outputting High to the notification channel CS. The camera MICOM 205 also outputs High to the notification channel CS upon the completion of the switching to the P2P communication. As described above, the lens MICOM 111, which is not selected as the communication partner in the P2P communication, outputs High to the notification channel CS at the time when the analysis and the internal processing for the data received from the camera MICOM 205 have finished.

Upon detecting the change of the signal level of the notification channel CS to High, the camera MICOM 205 starts the P2P communication illustrated in FIG. 5. The outline of the communication executed in the P2P communication is as per described above with reference to FIG. 5, and hence detailed description of the P2P communication is omitted here.

When the P2P communication between the camera MICOM 205 and the adapter MICOM 302 is completed, the camera MICOM 205 transmits, in the broadcast communication, the communication-partner designation data indicating that the lens MICOM 111 has been selected as the communication partner in the P2P communication. Thereafter, the P2P communication is performed between the camera MICOM 205 and the lens MICOM 111.

Judging from the event that the signal level of the notification channel CS has changed to Low before data is transmitted from the camera MICOM 205, the adapter MICOM 302 recognizes the fact that the switching from the P2P communication to the broadcast communication has been made.

Explanation of Communication Flow in Broadcast Communication

Figure 7:
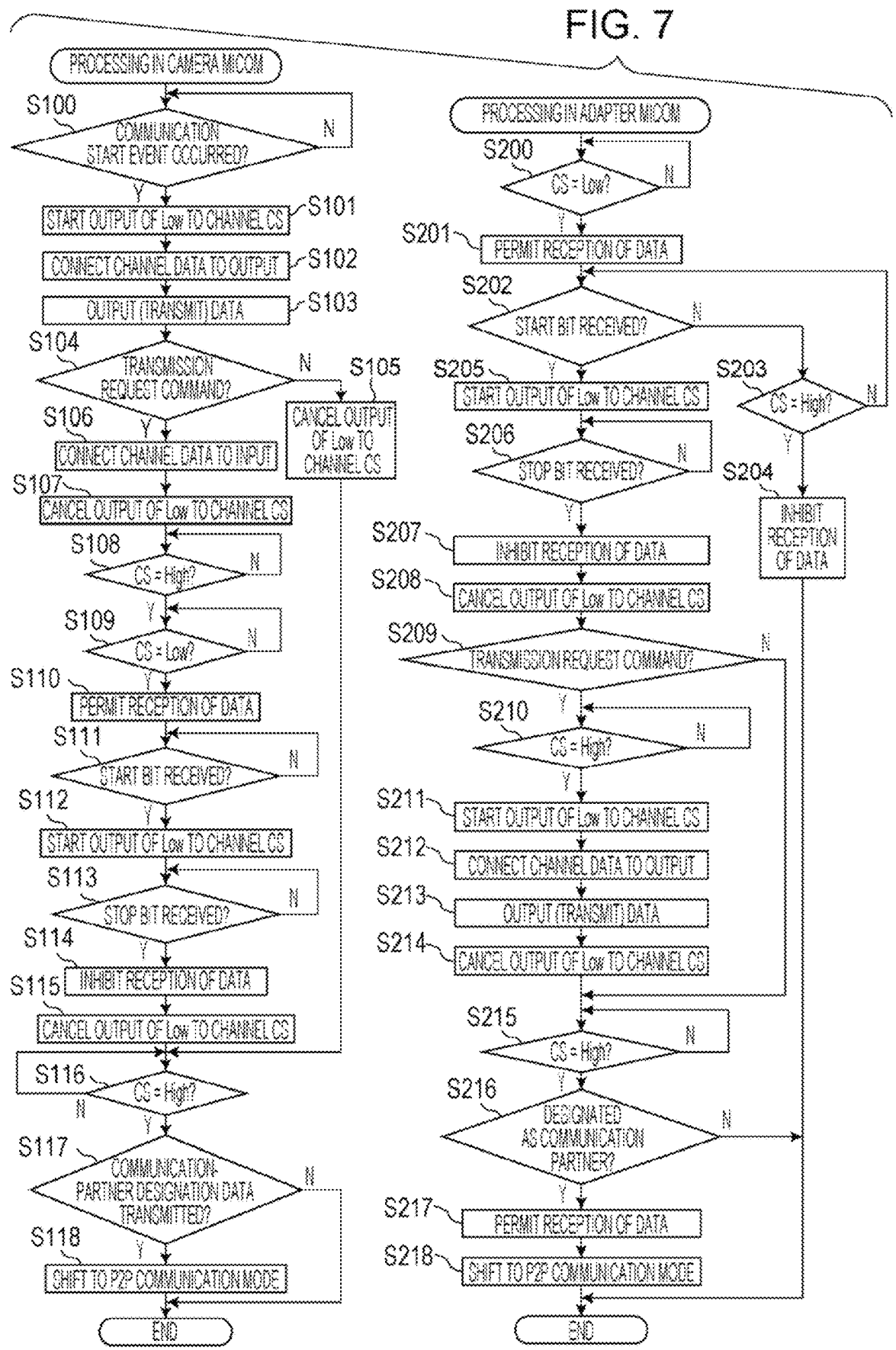
FIG. 7 is a flowchart referenced to explain a communication flow in the broadcast communication.

A communication flow in the broadcast communication will be described below with reference to FIG. 7. In FIG. 7, a flow from S100 to S118 on the left side represents processing executed by the camera MICOM 205. A flow from S200 to S218 on the right side represents processing executed by the adapter MICOM 302. The camera MICOM 205 and the adapter MICOM 302 execute communication control, illustrated in a flowchart of FIG. 7, in accordance with a communication control program that is a computer program. In FIG. 7, "S" stands for a step. FIG. 7 discloses a communication flow in the camera MICOM 205 that is the communication master, and a communication flow in the adapter MICOM 302 that is the communication slave. A communication flow in the lens MICOM 111 is substantially the same as that of the adapter MICOM 302, and hence description of the communication flow in the lens MICOM 111 is omitted here.

The camera MICOM 205 determines in S100 whether an event for starting the broadcast communication has occurred. If the event for starting the broadcast communication has occurred, the camera MICOM 205 goes to S101. If that event does not occur, the determination in S100 is repeated.

In S101, the camera MICOM 205 notifies the start of the broadcast communication to the lens MICOM 111 and the adapter MICOM 302 by outputting Low to the notification channel CS and changing the signal level of the notification channel CS to Low. Then, in S102, the camera MICOM 205 operates the input/output changeover switch 2082. The data communication channel DATA is thereby connected to the data output unit of the camera MICOM 205, and the data transmission is started in S103.

In S104, the camera MICOM 205 determines whether the transmission request command is included in the data transmitted from the camera MICOM 205 in S103. The transmission request command is a command of requesting the communication slave, which has received the data transmitted from the camera MICOM 205, i.e., the communication master, to transmit data to the camera MICOM 205.

If the camera MICOM 205 determines in S103 that the transmission request command is not included in the data transmitted from the camera MICOM 205, it goes to S105. In S105, the output of Low to the notification channel CS is canceled after the completion of the data transmission from the camera MICOM 205. Then, the camera MICOM 205 goes to S116.

If the camera MICOM 205 determines in S103 that the transmission request command is included in the data transmitted from the camera MICOM 205, it goes to S106. In S106, the camera MICOM 205 connects the data communication channel DATA to the data input unit of the camera MICOM 205 after the completion of the data transmission from the camera MICOM 205. Then, the camera MICOM 205 goes to S107. In S107, the camera MICOM 205 cancels the output of Low to the notification channel CS and outputs High.

In S108, the camera MICOM 205 determines whether the signal level of the notification channel CS has become High. This determination is continuously performed until the signal level of the notification channel CS becomes High. When the signal level of the notification channel CS is High, this indicates that the camera system is in the state capable of performing communication. If the signal level of the notification channel CS has become High, the camera MICOM 205 determines in S109 whether the signal level of the notification channel CS changes to Low. This determination is continuously performed until the signal level of the notification channel CS changes to Low.

In response to the change of the signal level of the notification channel CS to Low, communication from the adapter MICOM 302, i.e., the communication slave, to the camera MICOM 205 is started. After determining the change of the signal level of the notification channel CS to Low, the camera MICOM 205 permits in S110 the reception of data via the data communication channel DATA. Then, the camera MICOM 205 determines in S111 whether the start bit included in the data transmitted from the adapter MICOM 302 has been received. This determination is continuously performed until the start bit is received.

Upon receiving the start bit in S111, the camera MICOM 205 goes to S112. After outputting Low to the notification channel CS, the camera MICOM 205 determines in S113 whether the stop bit has been received. This determination is continuously performed until the stop bit received. Upon receiving the stop bit, the camera MICOM 205 inhibits the reception of data via the data communication channel DATA and executes analysis of the received data and internal processing corresponding to the received data in S114. Then, in S115, the camera MICOM 205 cancels the output of Low to the notification channel CS and outputs High.

Then, in S116, the camera MICOM 205 determines whether the signal level of the notification channel CS has become High. This determination is continuously performed until the signal level of the notification channel CS becomes High. If the signal level of the notification channel CS has become High, the camera MICOM 205 determines in S117 whether the data transmitted in S103 is the communication-partner designation data. If the camera MICOM 205 determines in S117 that the transmitted data is the communication-partner designation data, it goes to S118 for shift to the P2P communication. If the transmitted data is not the communication-partner designation data, the camera MICOM 205 continues the broadcast communication.

The communication flow in the adapter MICOM 302 will be described below. In S200, the adapter MICOM 302 determines whether the signal level of the notification channel CS has changed to Low. This determination is continuously performed until the signal level of the notification channel CS changes to Low. Because the data transmission from the camera MICOM 205, i.e., the communication master, is started in response to the change of the signal level of the notification channel CS to Low, the adapter MICOM 302 permits in S201 the reception of data via the data communication channel DATA.

Then, the adapter MICOM 302 determines in S202 whether the start bit has been received. If the adapter MICOM 302 determines in S202 that the start bit is not received, it goes to S203 and determines whether the signal level of the notification channel CS is High.

The reason why the processing of S203 and S204 executed here is to make the camera system adaptable for a situation in which the P2P communication is performed between the camera MICOM 205 and the lens MICOM 111 and only the adapter MICOM 302 performs the broadcast communication. Because the adapter MICOM 302 does not receive any data from the camera MICOM 205 in such a situation, it inhibits the reception of data via the data communication channel DATA.

As described in the above section <P2P Communication>, the signal level of the notification channel CS also changes between High and Low in the P2P communication. The signal level of the notification channel CS is High in a normal state. In the broadcast communication, the signal level of the notification channel CS is set to Low when the communication wait request is notified, or when the start of communication is notified. In the P2P communication, the signal level of the notification channel CS is set to Low when the communication wait request is notified.

A situation in which the adapter MICOM 302 does not receive the start bit from the camera MICOM 205 in S202 is supposed to be any of the following two situations.

The first situation is a situation in which the data transmission is not started after the camera MICOM 205 has changed the signal level of the notification channel CS to Low. The second situation is a situation in which the camera MICOM 205 and the lens MICOM 111 are performing the P2P communication and the adapter MICOM 302 does not take part in the P2P communication.

In the above-described first situation, because the signal level of the notification channel CS does not become High, the adapter MICOM 302 returns from S203 to S202 and repeats the determinations in S202 and S203 until the data transmission from the camera MICOM 205 is started.

In the above-described second situation, because the signal level of the notification channel CS remains High unless either one of the camera MICOM 205 and the lens MICOM 111 notifies the communication wait request. In this situation, the adapter MICOM 302 basically goes to S204 from S203 and inhibits the reception of data via the data communication channel DATA. When the communication wait request is notified in the P2P communication, the adapter MICOM 302 returns from S203 to S202 and executes the determination in S203 again. However, because a period during which the signal level of the notification channel CS is set to High is long in the P2P communication, the adapter MICOM 302 finally goes to S204 from S203.

By adding the control flow of S203 and S204 as described above, the broadcast communication and the P2P communication can be performed in a combined manner in the camera system. Thus, in this embodiment, the P2P communication can be performed between the camera MICOM 205 and the lens MICOM 111 while the adapter MICOM 302 can be held in a standby state adaptable for the broadcast communication.

Returning to the explanation of S202, upon receiving the start bit in S202, the adapter MICOM 302 starts analysis of the received data and internal processing corresponding to the received data, and outputs Low to the notification channel CS. The communication wait request is thereby notified to the components constituting the camera system.

Then, the adapter MICOM 302 determines in S206 whether the stop bit has been received. This determination s continuously performed until the stop bit is received. If the adapter MICOM 302 determines that the stop bit has been received, it inhibits the reception of data via the data communication channel DATA and continues the analysis of the received data and the internal processing corresponding to the received data in S207. When the internal processing of the data is completed and a state capable of executing the next data communication is established, the adapter MICOM 302 cancels the output of Low to the notification channel CS and outputs High in S208.

In S209, the adapter MICOM 302 determines whether the transmission request command is included in the data received from the camera MICOM 205. If the adapter MICOM 302 determines that the transmission request command is included, it goes to S210 and determines whether the signal level of the notification channel CS has become High. This determination is continuously performed until the signal level of the notification channel CS becomes High. When the signal level of the notification channel CS is High, this indicates that the camera system is in the state capable of performing communication. If the adapter MICOM 302 determines that the transmission request command is not included in the data received from the camera MICOM 205, it goes to later-described S215.

If the adapter MICOM 302 determines in S210 that the signal level of the notification channel CS is High, it goes to S211. In S211, the adapter MICOM 302 outputs Low to the notification channel CS to change the signal level of the notification channel CS to Low, thereby notifying the start of the broadcast communication to the camera MICOM 205 and the lens MICOM 111. Then, in S212, the input/output changeover switch 3032 is operated to connect the data communication channel DATA to the data output unit of the adapter MICOM 302. The data transmission is started in S213.

Upon the completion of the data transmission, the adapter MICOM 302 cancels the output of Low to the notification channel CS and outputs High in S214. Then, in S215, the adapter MICOM 302 determines whether the signal level of the notification channel CS has become High. This determination is continuously performed until the signal level of the notification channel CS becomes High.

If the signal level of the notification channel CS has become High, the adapter MICOM 302 goes to S216. In S216, the adapter MICOM 302 determines whether the data received from the camera MICOM 205 is the communication-partner designation data, and whether the adapter MICOM 302 is selected as the communication partner with the camera MICOM 205 in the P2P communication. If the adapter MICOM 302 determines that the adapter MICOM 302 is selected as the communication partner with the camera MICOM 205 in the P2P communication, it goes to S217 and permits the reception of data via the data communication channel DATA. Then, in S218, the adapter MICOM 302 shifts the communication mode from the broadcast communication to the P2P communication.

If the data received from the camera MICOM 205 is not the communication-partner designation data and it is determined that the adapter MICOM 302 is not selected as the communication partner in the P2P communication, the adapter MICOM 302 continues the broadcast communication without shifting to the P2P communication.

Communication Flow in P2P Communication

Figure 8:
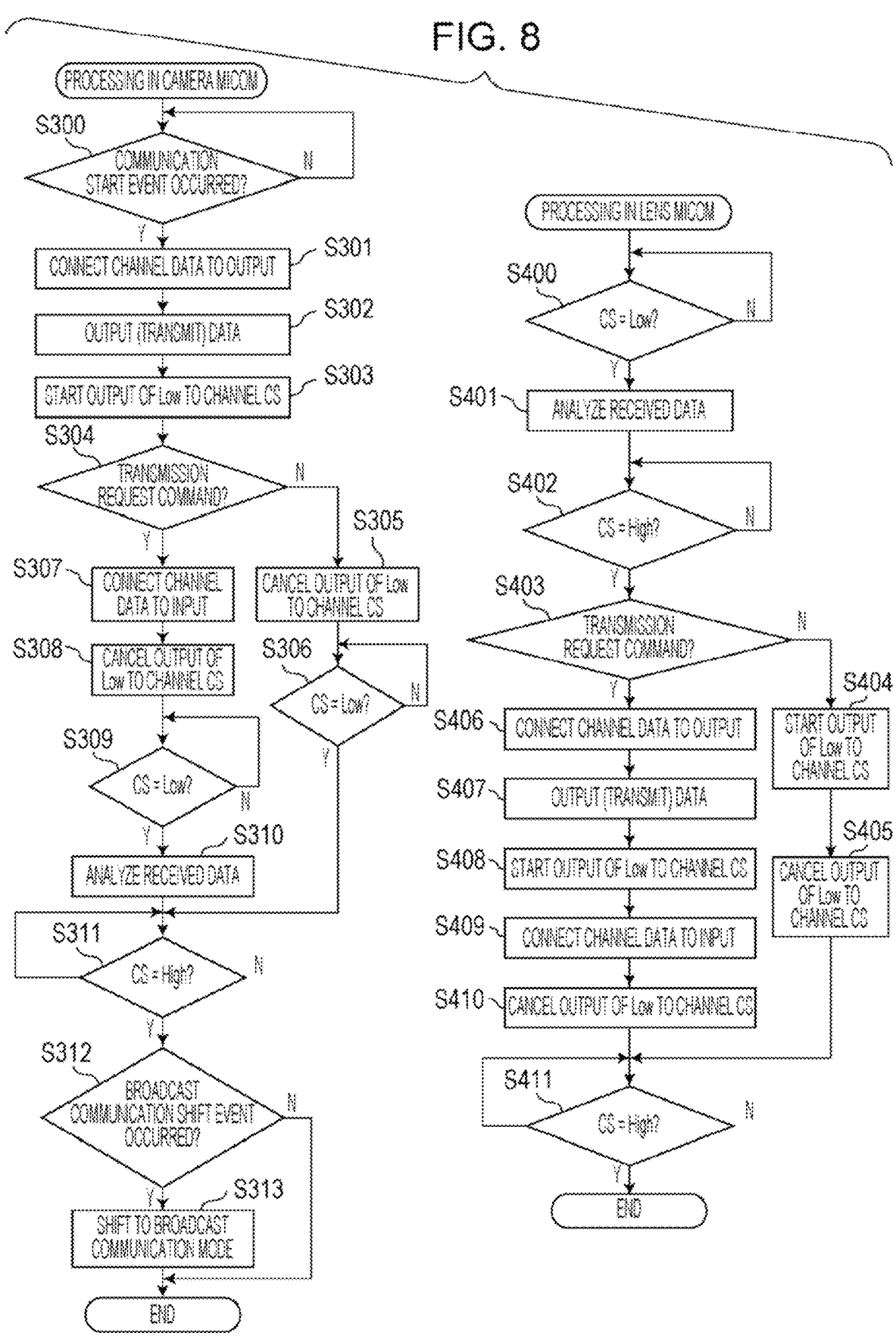
FIG. 8 is a flowchart referenced to explain a communication flow in the P2P communication.

A communication flow in the P2P communication will be described below with reference to FIG. 8. In FIG. 8, a flow from S300 to S313 on the left side represents processing executed by the camera MICOM 205. A flow from S400 to S411 on the right side represents processing executed by the lens MICOM 111. The camera MICOM 205 and the lens MICOM 111 execute communication control, illustrated in a flowchart of FIG. 8, in accordance with a communication control program that is a computer program. In FIG. 8, "S" stands for a step. FIG. 8 discloses a communication flow in the camera MICOM 205 that is the communication master, and a communication flow in the lens MICOM 111 that is the communication slave. A communication flow in the adapter MICOM 302 is substantially the same as that of the lens MICOM 111, and hence description of the communication flow in the adapter MICOM 302 is omitted here.

The camera MICOM 205 determines in S300 whether an event for starting the P2P communication has occurred. If the camera MICOM 205 determines that the event for starting the P2P communication has occurred, it goes to S301. If the camera MICOM 205 determines that such an event does not occur, it repeats the determination in S300.

In S301, the camera MICOM 205 operates the input/output changeover switch 2082 and connects the data communication channel DATA to the data output unit of the camera MICOM 205. Then, the camera MICOM 205 starts the data transmission in S302.

In S303, the camera MICOM 205 outputs Low to the notification channel CS, thereby changing the signal level of the notification channel CS to Low. Thus, the camera MICOM 205 issues the communication wait request to the lens MICOM 111 that is the communication slave. During a period in which the signal level of the notification channel CS is Low, the lens MICOM 111 does not perform the data transmission to the camera MICOM 205.

In S304, the camera MICOM 205 determines whether the transmission request command is included in the data transmitted from the camera MICOM 205 in S302. The transmission request command is a command of requesting the communication slave to transmit data to the camera MICOM 205. If the transmission request command is not included in the data transmitted from the camera MICOM 205 in S302, no data is transmitted from the lens MICOM 111. In this case, the camera MICOM 205 goes to S305 from S304 and checks whether the lens MICOM 111 notifies the communication wait request.

More specifically, the camera MICOM 205 cancels the output of Low to the notification channel CS from the camera MICOM 205 in S305, and determines in S306 whether the signal level of the notification channel CS is Low. As a result, it is possible to determine whether the lens MICOM 111 sets the signal level of the notification channel CS to Low, i.e., whether the lens MICOM 111 notifies the communication wait request.

In general, the lens MICOM 111 having received data from the camera MICOM 205 notifies the communication wait request by outputting Low to the notification channel CS for a certain period in order to execute analysis and internal processing of the received data. S306 is executed to recognize the communication wait request from the lens MICOM 111. After S305, the signal level of the notification channel CS temporarily becomes High in some cases. In such a case, the camera MICOM 205 waits for change of the signal level of the notification channel CS to Low by repeating the determination in S306. After confirming in S306 that the signal level of the notification channel CS has changed to Low, the camera MICOM 205 goes to S311.

Let now return to S304. If the camera MICOM 205 determines in S304 that the data transmitted from the camera MICOM 205 in S302 is the transmission request command, it goes to S307.

In S307, the camera MICOM 205 operates the input/output changeover switch 2082 and connects the data communication channel DATA to the data input unit of the camera MICOM 205. Furthermore, in S308, the camera MICOM 205 cancels the output of Low to the notification channel CS and outputs High.

The camera MICOM 205 receives data from the lens MICOM 111 in a state in which the signal level of the notification channel CS is High. Then, in S309, the camera MICOM 205 determines whether the signal level of the notification channel CS has changed to Low. In response to the change of the signal level of the notification channel CS to Low, the camera MICOM 205 determines that the data transmission from the lens MICOM 111 has been completed, and executes data analysis in S310.

Then, in S311, the camera MICOM 205 determines whether the signal level of the notification channel CS has become High. This determination is continuously performed until the signal level of the notification channel CS becomes High. The state in which the signal level of the notification channel CS is High indicates that the lens MICOM 111, i.e., the communication slave, is in the state capable of performing data communication.

If the signal level of the notification channel CS has become High, the camera MICOM 205 goes to S312 and determines whether an event for shifting to the broadcast communication has occurred. If the event for shifting to the broadcast communication has occurred, the camera MICOM 205 goes to S313 and shifts the communication mode to the broadcast communication. If the event for shifting to the broadcast communication does not occur, the camera MICOM 205 continuously performs the P2P communication.

The communication flow in the lens MICOM 111, i.e., the communication slave, will be described below. After executing the switching from the broadcast communication to the P2P communication, the lens MICOM 111 first receives data transmitted from the camera MICOM 205. During a period in which the lens MICOM 111 receives the data transmitted from the camera MICOM 205, the signal level of the notification channel CS is kept High.

Then, in S400, the lens MICOM 111 determines whether the signal level of the notification channel CS has changed to Low. In response to the change of the signal level of the notification channel CS to Low, the lens MICOM 111 determines that the data transmission from the camera MICOM 205 has been completed, and then executes analysis of the received data in S401.

Then, in S402, the lens MICOM ill determines whether the signal level of the notification channel CS has become High. This determination is continuously performed until the signal level of the notification channel CS becomes High. The state in which the signal level of the notification channel CS is Low indicates that the camera MICOM 205 is in the state notifying the communication wait request.

If the signal level of the notification channel CS has become High, the lens MICOM 111 determines in S403 whether the transmission request command is included in the data received from the camera MICOM 205. If the transmission request command is not included in the data received from the camera MICOM 205, the lens MICOM 111 goes to S404.

In S404, by changing the signal level of the notification channel CS to Low, the lens MICOM 111 notifies the communication wait request to the camera MICOM 205 in order to execute internal processing for the data received from the camera MICOM 205, etc. When the lens MICOM 111 comes into the state capable of performing communication, it sets the signal level of the notification channel CS to High and cancels the communication wait request in S405. Thereafter, the lens MICOM 111 goes to S411.

Let now return to S403. If the lens MICOM 111 determines in S403 that the transmission request command is included in the data received from the camera MICOM 205, it goes to S406. In S406, the lens MICOM 111 operates the input/output changeover switch 1122 and connects the data communication channel DATA to the data output unit of the lens MICOM 111. Then, in S407, the lens MICOM 111 starts the data transmission to the camera MICOM 205.

After the data transmission from the lens MICOM 111 to the camera MICOM 205 has been completed, the lens MICOM 111 goes to S408. In S408, the lens MICOM 111 outputs Low to the notification channel CS, thereby changing the signal level of the notification channel CS to Low. Thus, the lens MICOM 111 issues the communication wait request to the camera MICOM 205 that is the communication master. During a period in which the signal level of the notification channel CS is Low, the camera MICOM 205 does not perform the data transmission to the lens MICOM 111.

In S409, the lens MICOM 111 operates the input/output changeover switch 1122 and connects the data communication channel DATA to the data input unit of the lens MICOM 111. Then, in S410, the lens MICOM 111 cancels the output of Low to the notification channel CS and outputs High.

In S411, the lens MICOM 111 determines whether the signal level of the notification channel CS has become High. This determination is continuously performed until the signal level of the notification channel CS becomes High. The state in which the signal level of the notification channel CS is High indicates that the camera MICOM 205 and the lens MICOM 111 are in the state capable of performing communication.

Explanation of Communication Request

Communication control in notifying a communication request from the microcomputer included in the accessory device, such as the lens MICOM 111 or the adapter MICOM 302, to the camera MICOM 205 will be described below with reference to FIG. 9.

In the broadcast communication described with reference to FIG. 4, the camera MICOM 205 outputs Low to the notification channel CS, thereby changing the signal level of the notification channel CS to Low and notifying the start of the broadcast communication to each communication save.

Broadcast communication illustrated in FIG. 9 represents an example in which the lens MICOM 111 or the adapter MICOM 302, i.e., the communication slave, requests the start of the broadcast communication to the camera MICOM 205. The communication request to the camera MICOM 205 is executed when the microcomputer included in the accessory device takes the initiative in restarting the communication with the camera MICOM 205 in a state in which the communication from the camera MICOM 205 to the microcomputer included in the accessory device is temporarily stopped.

The communication request by the accessory device is executed, for example, when the operating member disposed in the intermediate adapter 300 is operated by the user. When communication restarted in the camera system from the state in which the communication is temporarily stopped, it is basically appropriate that the camera MICOM 205, i.e., the communication master, takes the initiative in restarting the communication. Giving the microcomputer included in the accessory device, i.e., the communication slave, with the function of restarting the communication may accompany a possibility that the communication is restarted at the timing not expected by the camera MICOM 205, i.e., the communication master. Accordingly, giving the communication slave with the function of restarting the communication in an unlimited fashion is not desired.

Taking into account the above point, in this embodiment, the microcomputer included in the accessory device, i.e., the communication slave, is given with the function of restarting the communication by issuing a communication start request to the camera MICOM 205 from the microcomputer included in the accessory device.

FIG. 9 illustrates a communication waveform when the lens MICOM ill issues the communication request. The lens MICOM 111, i.e., the communication slave, monitors the occurrence of a communication start event. If the communication start event has occurred, the lens MICOM 111 outputs Low to the notification channel CS, thereby changing the signal level of the notification channel CS to Low.

In response to the change of the signal level of the notification channel CS to Low, the camera MICOM 205 outputs Low to the notification channel CS and starts the broadcast communication. A flow of the broadcast communication after the output of Low to the notification channel CS is the same as the flow described with reference to FIG. 4, and hence description of that flow is omitted here.

Explanation of Control of Operating States

A method of controlling operating states of the lens MICOM 111 and the adapter MICOM 302 will be described below. First, a sleep process executed in the present invention is described. The sleep process is a process of switching the operating state of each of the lens MICOM III and the adapter MICOM 302 between an active state (normal power-consumption state) and a sleep state (low power-consumption state). The lens MICOM 111 and the adapter MICOM 302 can be switched between the active state in which each MICOM operates in response to a user operation without delay while steadily performing communication with the camera MICOM 205 and the sleep state in which power consumption is smaller than in the active state and each MICOM does not perform communication.

The camera MICOM 205 switches the lens MICOM 111 and the adapter MICOM 302 to the sleep state, for example, when any user operation is not input for a predetermined time in the active state. As a result, the camera system can realize power saving. Furthermore, when any user operation occurs on the interchangeable lens 100 in the sleep state of the lens MICOM 111, the camera MICOM 205 switches the lens MICOM 111 to the active state. Similarly, when any user operation occurs on the intermediate adapter 300 in the sleep state of the adapter MICOM 302, the camera MICOM 205 switches the adapter MICOM 302 to the active state.

Figure 10A:
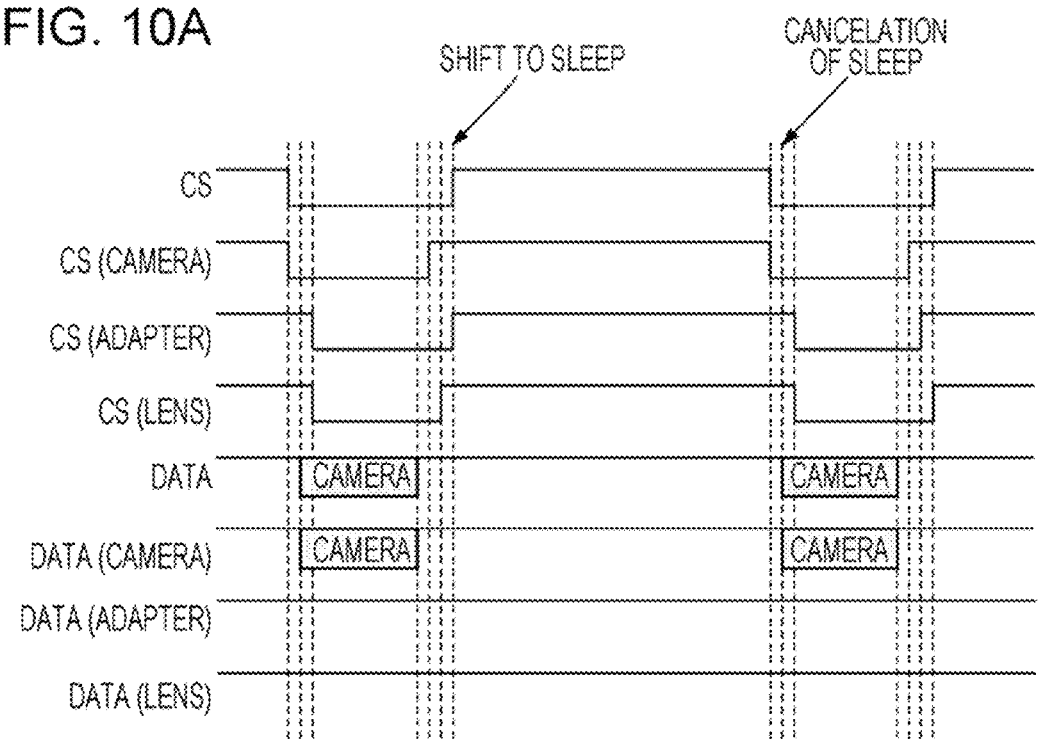
FIG. 10A is a schematic view illustrating communication waves when an operating state of the accessory device is switched between an active state and a sleep state.

FIG. 10A illustrates signal waves in communication performed among the camera MICOM 205, the lens MICOM 111, and the adapter MICOM 302 when the lens MICOM 111 and the adapter MICOM 302 are switched from the active state to the sleep state.

First, communication in shifting the lens MICOM 111 and the adapter MICOM 302 from the active state to the sleep state is described. The communication in shifting the lens MICOM 111 and the adapter MICOM 302 from the active state to the sleep state by the camera MICOM 205 is performed in the broadcast communication. The camera MICOM 205, i.e., the communication master, executes the broadcast communication in accordance with the procedures described with reference to FIG. 4.

In the above broadcast communication, the camera MICOM 205 can transmit, to the lens MICOM 111 and the adapter MICOM 302, sleep instruction data for shifting them from the active state to the sleep state. Upon receiving the sleep instruction data in the broadcast communication, the lens MICOM 111 and the adapter MICOM 302, each being the communication slave, execute a shift process to the sleep state and cancel the output of Low to the notification channel CS after the completion of the shift process.

Next, communication in shifting the lens MICOM III and the adapter MICOM 302 from the sleep state to the active state is described. A process of shifting the lens MICOM 111 and the adapter MICOM 302 from the sleep state to the active state by the camera MICOM 205 is performed in the broadcast communication. The camera MICOM 205, i.e., the communication master, executes the broadcast communication in accordance with the procedures described with reference to FIG. 4.

In the above broadcast communication, active instruction data representing an instruction (request) for shifting the lens MICOM 111 and the adapter MICOM 302 from the sleep state to the active state is transmitted to the lens MICOM 111 and the adapter MICOM 302. Upon receiving the active instruction data in the broadcast communication, the lens MICOM 111 and the adapter MICOM 302, each being the communication slave, execute a shift process to the active state and cancel the output of Low to the notification channel CS after the completion of the shift process.

The shift of the lens MICOM 111 and the adapter MICOM 302 from the sleep state to the active state may be performed when the active instruction data is received, or when the start bit is received via the data communication channel DATA.

FIG. 10A represents an example in which the lens MICOM 111 and the adapter MICOM 302 are shifted from the sleep state to the active state by using the broadcast communication that is started from the camera MICOM 205. Alternatively, the lens MICOM 111 and the adapter MICOM 302 in the sleep state may request output of the active instruction data that instructs the camera MICOM 205 to execute the shift to the active state. This request for requesting the camera MICOM 205 to output the active instruction data is called a sleep cancelation request hereinafter.

Figure 10B:
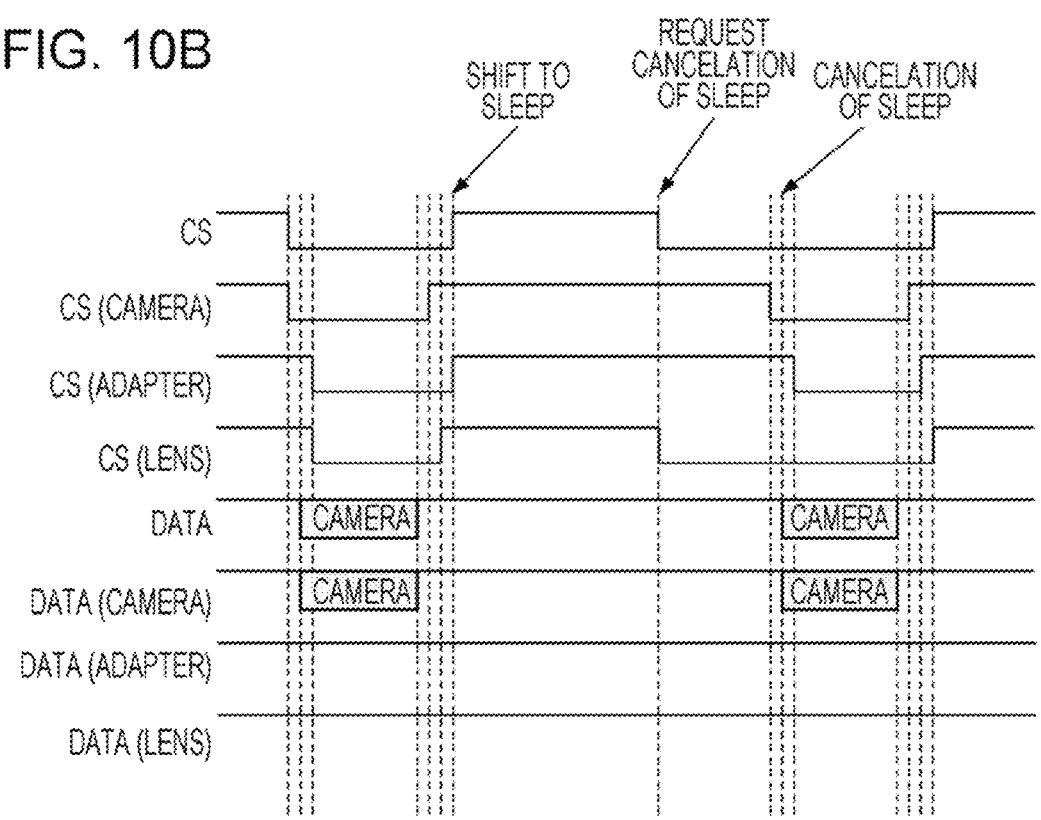
FIG. 10B is a schematic view illustrating communication waves when the operating state of the accessory device is switched between the active state and the sleep state.

FIG. 10B represents an example in which the lens MICOM 111 outputs the sleep cancelation request. The sleep cancelation request is issued in similar procedures to those for the communication request illustrated in FIG. 9.

For example, when an event for shifting to the active state is generated by the user operation in the sleep state, the lens MICOM 111 outputs the sleep cancelation request to the camera MICOM 205 by outputting a predetermined signal to the notification channel CS. As a practical example of outputting the predetermined signal, the lens MICOM 111 outputs Low to the notification channel CS. Thereafter, the camera MICOM 205 having received the output from the lens MICOM 111 executes the broadcast communication in accordance with the procedures described with reference to FIG. 9, and transmits the active instruction data to the lens MICOM 111 and the adapter MICOM. As a result, the lens MICOM 111 and the adapter MICOM 302 shift to the active state.

In another configuration, the lens MICOM 111 and the adapter MICOM 302 may be shifted from the sleep state to the active state in response to the change of the signal level of the notification channel CS to Low. In such a case, however, the lens MICOM 111 and the adapter MICOM 302 are shifted to the active state in response to output of the sleep cancelation request from the lens MICOM 111 or the adapter MICOM 302. From the viewpoint of controlling the shift of the lens MICOM 111 and the adapter MICOM 302 to the active state by the camera MICOM 205 that is the communication master, therefore, it is desired that the above shift is executed by transmitting the active instruction data via the data communication channel DATA.

According to the present invention, as described above, when the event for shifting to the active state has occurred in the lens MICOM 111 or the adapter MICOM 302 that is the communication slave, the sleep cancelation request is issued to the camera MICOM 205 via the notification channel CS. When the camera MICOM 205 shifts the lens MICOM 111 and the adapter MICOM 302 from the active state to the sleep state, it transmits the sleep instruction data via the data communication channel DATA.

Figure 11:
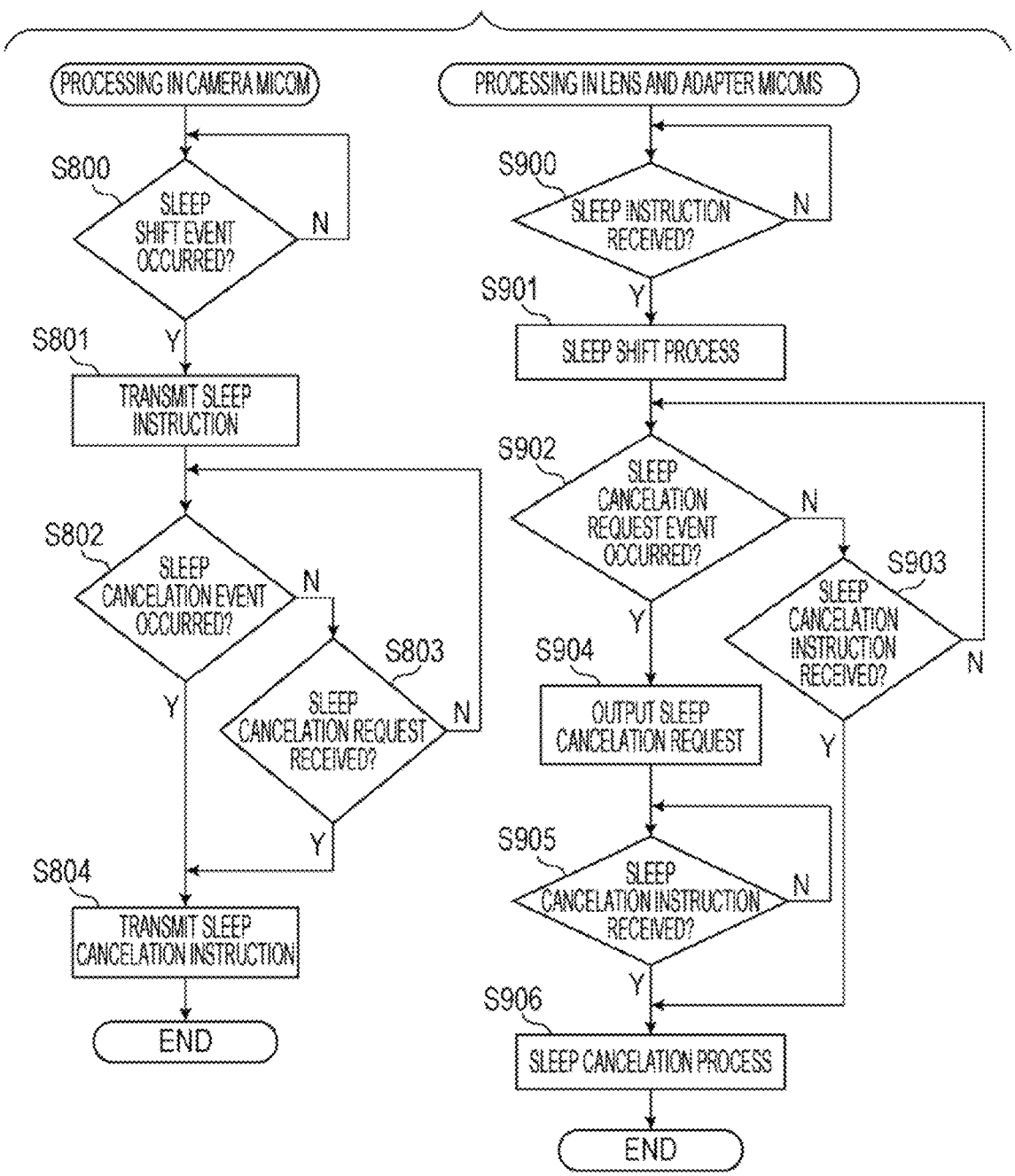
FIG. 11 is a flowchart illustrating a process of switching the operating state of the accessory device between the active state and the sleep state.

A process of changing the operating states of the lens MICOM 111 and the adapter MICOM 302, each being the communication slave, between the active state and the sleep state will be described below with reference to a flowchart of FIG. 11. The camera MICOM 205, the adapter MICOM 302, and the lens MICOM 111 execute communication control, illustrated in the flowchart of FIG. 11, in accordance with a communication control program that is a computer program. In FIG. 11, "S" stands for a step.

If the event for shifting the lens MICOM 111 and the adapter MICOM 302 from the active state to the sleep state occurs in step S800, the camera MICOM 205 goes to step S801. In step S801, the camera MICOM 205 transmits the sleep instruction data to the lens MICOM 111 and the adapter MICOM 302 via the broadcast communication. Upon receiving the sleep instruction data from the camera MICOM 205 in step S900, the lens MICOM 111 and the adapter MICOM 302 execute a sleep shift process in step S901. The sleep shift process includes, for example, a process of turning off an internal power supply, a process of setting a shift factor for shift to the active state next time.

Thereafter, if the event for shifting the lens MICOM 111 and the adapter MICOM 302 from the sleep state to the active state occurs in step S802, the camera MICOM 205 goes to step S804. The camera MICOM 205 also goes to step S804 if it receives the sleep cancelation request, which requests transmission of the active instruction data, from the lens MICOM 111 and the adapter MICOM 302 in step S803.

In step S804, the camera MICOM 205 transmits the active instruction data to the lens MICOM 111 and the adapter MICOM 302 via the broadcast communication. On the other hand, if the event for shifting to the active state occurs in the sleep state in S902, the lens MICOM 111 and the adapter MICOM 302 go to step S904.

In step S904, the lens MICOM 111 and the adapter MICOM 302 output, to the camera MICOM 205, the sleep cancelation request that requests transmission of the active instruction data. Thereafter, upon receiving the active instruction data from the camera MICOM 205 via the broadcast communication in step S905, the lens MICOM 111 and the adapter MICOM 302 execute a sleep cancelation process in step S906. Even in the case of not outputting the sleep cancelation request, the lens MICOM 111 and the adapter MICOM 302 execute the sleep cancelation process in step S906 if they receive the active instruction data from the camera MICOM 205 via the broadcast communication in step S903.

In this embodiment, the lens MICOM 111 and the adapter MICOM 302 can be appropriately shifted between the active state and the sleep state under control of the camera MICOM 205 by using the notification channel CS and the data communication channel DATA. Furthermore, the lens MICOM 111 and the adapter MICOM 302 can request for the camera MICOM 205 to transmit the active instruction data even when they are in the sleep state.

The above-described embodiment can be implemented by additionally using other communication channels in combination with the notification channel CS and the data communication channel DATA.

Figure 12:
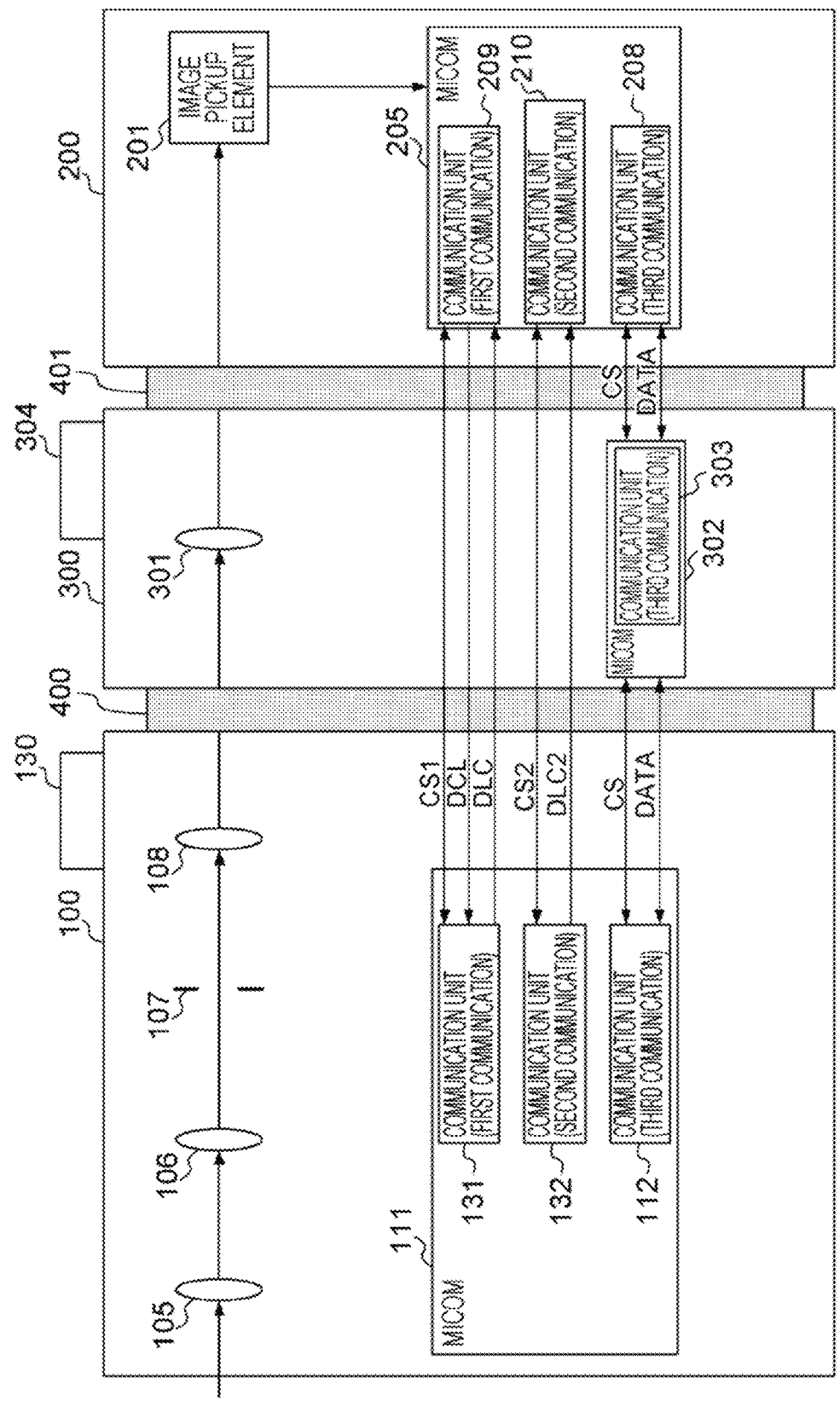
FIG. 12 is an explanatory view referenced to explain other communication channels.

An example of such a case will be described below with reference to FIG. 12. In FIG. 12, the same components as those in FIG. 1 are denoted by the same reference numerals, and duplicate description of the same components is omitted. The notification channel CS and the data communication channel DATA in the above description correspond to a communication line for communication called here third communication.

The lens MICOM 111 controls, in addition to the communication unit 112, a communication unit 131 for first communication and a communication unit 132 for second communication. The camera MICOM 205 controls, in addition to the communication unit 112, a communication unit 209 for the first communication and a communication unit 210 for the second communication.

The first communication is first described. The first communication is performed with the aid of the communication unit 131 and the communication unit 209. Via a notification channel CS1, a data communication channel DCL, and a data communication channel DLC, the communication unit 131 performs the communication in accordance with an instruction from the lens MICOM 111, and the communication unit 209 performs the communication in accordance with an instruction from the camera MICOM 205. The communication unit 131 and the communication unit 209 set a voltage level of the notification channel CS1, a communication rate (data amount per unit time) in start-stop synchronization communication, and a communication voltage. Furthermore, the communication unit 131 and the communication unit 209 transmit and receive data via the data communication channel DCL and the data communication channel DLC upon receiving instructions from the lens MICOM 111 and the camera MICOM 205.

The notification channel CS1 is a signal line used, for example, to notify a communication request from the camera main unit 200 to the interchangeable lens 100. The data communication channel DCL is a channel used when data is transmitted from the camera main unit 200 to the interchangeable lens 100, and the data communication channel DLC is a channel used when data is transmitted from the interchangeable lens 100 to the camera main unit 200.

In the first communication, the camera MICOM 205 and the lens MICOM 111 perform the communication according to clock synchronization communication or start-stop synchronization communication. Initial communication performed after the interchangeable lens 100 has been connected to the camera main unit 200 is also performed according to the first communication at the beginning. The camera MICOM 205 and the lens MICOM 111 communicate identification information of the interchangeable lens 100 and switch the communication mode from the clock synchronization communication to the start-stop synchronization communication if it is determined that the interchangeable lens 100 mounted to the camera main unit 200 is adaptable for the start-stop synchronization communication. From the result of the communication of the identification information, the camera MICOM 205 may determine whether the interchangeable lens 100 is adaptable for the third communication in which communication is performed with inclusion of the adapter 300 as well. If the camera MICOM 205 determines that the interchangeable lens 100 is adaptable for the third communication, it may perform authentication communication, which is to recognize the interchangeable lens 100 and the intermediate adapter 300, via the P2P communication.

Next, the second communication is described. The second communication is one-way communication from the interchangeable lens 100 to the camera main unit 200. The second communication is performed with the aid of the communication unit 132 and the communication unit 210. Via a notification channel CS2 and a data communication channel DLC2, the communication unit 132 performs communication in accordance with an instruction from the lens MICOM 111, and the communication unit 210 performs communication in accordance with an instruction from the camera MICOM 205. The camera communication unit 208 and the lens communication unit 118 transmit and receive data according to the clock synchronization communication or the start-stop synchronization communication. By using not only the data communication channel DLC for the first communication, but also the data communication channel DLC2 for the second communication, a large amount of data can be transmitted from the interchangeable lens 100 to the camera main unit 200 in a short time.

The above-described embodiment is merely a typical example, and various modifications or alterations can be made on the embodiment when the present invention is practically implemented. For instance, while the above-described embodiment represents an example in which the interchangeable lens and the intermediate adapter are used as the accessory devices, an interchangeable lens directly mounted to the camera main unit, a strobe directly mounted to the camera main unit, etc. may also be used as the accessory devices.

According to the present invention, the accessory device and the camera are obtained which can appropriately control the operating state between the camera and the accessory device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An accessory device removably mounted to a camera and being able to switch an operating state between an active state and a sleep state in which power consumption is smaller than in the active state,
the accessory device comprising an accessory control unit controlling communication that is performed between the camera and the accessory device via channels, the channels including a notification channel used for signal transfer between the camera and the accessory device and a data communication channel used for data communication between the camera and the accessory device,
wherein the accessory control unit
outputs a predetermined signal via the notification channel in the sleep state,
receives, via the data communication channel, active instruction data that is transmitted from the camera in response to output of the predetermined signal, and that instructs switching of the operating state of the accessory device from the sleep state to the active state, and
switches the operating state of the accessory device from the sleep state to the active state upon receiving the active instruction data from the camera.

2. The accessory device according to claim 1, wherein the accessory control unit is able to set a voltage level of the notification channel to a first level and a second level higher than the first level, and
the predetermined signal is represented by change of the voltage level of the notification channel from the second level to the first level.

3. The accessory device according to claim 1, wherein the accessory control unit switches the operating state of the accessory device to the sleep state upon receiving sleep instruction data from the camera via the data communication channel, the sleep instruction data instructing switching of the operating state of the accessory device from the active state to the sleep state.

4. The accessory device according to claim 1, further comprising an operating member operable by a user,
wherein the accessory control unit outputs the predetermined signal to the notification channel in response to an operation of the operating member in the sleep state.

5. A camera to which an accessory device is mountable, the accessory device being able to switch an operating state between an active state and a sleep state in which power consumption is smaller than in the active state, the camera comprising a camera control unit controlling communication that is performed between the camera and the accessory device via channels, the channels including a notification channel used for signal transfer between the camera and the accessory device and a data communication channel used for data communication between the camera and the accessory device, wherein the camera control unit transmits active instruction data to the accessory device via the data communication channel upon receiving a predetermined signal output to the notification channel from the accessory device in the sleep state, the active instruction data instructing switching of the operating state of the accessory device from the sleep state to the active state.

6. The camera according to claim 5, wherein the camera control unit changes the operating state of the accessory device to the sleep state by transmitting sleep instruction data to the accessory device via the data communication channel, the sleep instruction data instructing the switching of the operating state of the accessory device from the active state to the sleep state.

7. A non-transitory computer readable storage medium storing a communication control program for a computer in an accessory device removably mounted to a camera and being able to switch an operating state between an active state and a sleep state in which power consumption is smaller than in the active state, the accessory device performing communication with the camera via channels including a notification channel used for signal transfer between the camera and the accessory device and a data communication channel used for data communication between the camera and the accessory device, the communication control program causing the computer to execute steps of:

outputting a predetermined signal via the notification channel in the sleep state;

receiving, via the data communication channel, active instruction data that is transmitted from the camera in response to output of the predetermined signal, and that instructs switching of the operating state of the accessory device from the sleep state to the active state, and switching the operating state of the accessory device from the sleep state to the active state.

8. A non-transitory computer readable storage medium storing a communication control program for a computer in a camera to which an accessory device is mountable, the accessory device being able to switch an operating state between an active state and a sleep state in which power consumption is smaller than in the active state, the camera performing communication with the accessory device via channels including a notification channel used for signal transfer between the camera and the accessory device and a data communication channel used for data communication between the camera and the accessory device, the communication control program causing the computer to execute steps of:

receiving a predetermined signal output from the accessory device in the sleep state via the notification channel; and transmitting active instruction data to the accessory device via the data communication channel upon receiving the predetermined signal, the active instruction data instructing switching of the operating state of the accessory device from the sleep state to the active state.

9. An image pickup system comprising an accessory device being able to switch an operating state between an active state and a sleep state in which power consumption is smaller than in the active state, and a camera to which the accessory device is mountable, wherein the accessory device includes an accessory control unit controlling communication that is performed between the camera and the accessory device via channels, the channels including a notification channel used for signal transfer between the camera and the accessory device and a data communication channel used for data communication between the camera and the accessory device, the camera includes a camera control unit controlling communication that is performed between the camera and the accessory device via the channels including the notification channel and the data communication channel, the accessory control unit outputs a predetermined signal via the notification channel in the sleep state, the camera control unit transmits, upon receiving the predetermined signal, active instruction data to the accessory device via the data communication channel, the active instruction data instructing switching of the operating state of the accessory device from the sleep state to the active state, and the accessory control unit switches the operating state from the sleep state to the active state upon receiving the active instruction data.

\* \* \* \* \*